(12) United States Patent
Kawada

(10) Patent No.: US 6,597,806 B1
(45) Date of Patent: Jul. 22, 2003

(54) IMAGE PROCESSING METHOD AND APPARATUS

(75) Inventor: Tousuke Kawada, Chiryu (JP)

(73) Assignee: Fuji Machine Mfg. Co., Ltd., Aichi-Ken (JP)

( * ) Notice: Subject to any disclaimer, the term of this patent is extended or adjusted under 35 U.S.C. 154(b) by 0 days.

(21) Appl. No.: 09/453,725

(22) Filed: Dec. 3, 1999

(30) Foreign Application Priority Data

Jan. 13, 1999 (JP) .......................................... 11-007070

(51) Int. Cl.$^7$ ................................................ G06K 9/00
(52) U.S. Cl. ...................................... 382/151; 382/209
(58) Field of Search ................................ 382/151, 209; 348/129, 130

(56) References Cited

U.S. PATENT DOCUMENTS

| | | |
|---|---|---|
| 4,399,554 A | 8/1983 | Perkins, III et al. |
| 4,536,856 A | 8/1985 | Hiroishi |
| 5,136,661 A | 8/1992 | Kobayasi et al. |
| 5,515,159 A | 5/1996 | Sites et al. |
| 5,586,058 A | 12/1996 | Aloni et al. |
| 5,754,677 A * | 5/1998 | Kawada ....................... 382/141 |
| 5,774,574 A * | 6/1998 | Hoki ........................... 348/129 |
| 5,793,901 A * | 8/1998 | Matsutake et al. ........... 382/151 |
| 5,911,001 A | 6/1999 | Kawada |
| 6,356,300 B1 * | 3/2002 | Shiba ........................... 348/130 |

* cited by examiner

Primary Examiner—Amelia M. Au
Assistant Examiner—Virginia Kibler
(74) Attorney, Agent, or Firm—Oliff & Berridge, PLC

(57) ABSTRACT

A method of processing an image of an object to obtain a dimension-difference relating amount which relates to a difference of an actual dimension of the object from a reference dimension thereof, the method including the steps of producing a plurality of search lines each of which perpendicularly intersects a corresponding one of a plurality of substantially straight portions of an edge of the image of the object, and obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines.

14 Claims, 33 Drawing Sheets

```
PRELIMINARY-PROCESSING PROGRAM
begin
    while (for each object to be image-processed)
        if (pattern matching is carried out) then
            while (a master seek template is rotated by changing a rotation angle
                to every 5 degrees from -45 degrees to +45 degrees)
                    individual seek templates are produced based on the master
                    seek template
            endwhile
        endif
    endwhile
end
```

FIG. 11

```
IMAGE-PROCESSING PROGRAM
begin
    if (an object is to be image-processed by only a pattern matching) then
        image processing is carried out by the pattern matching ()
    else if (an object is to be image-processed by the combination of pattern matchings) then
        image processing is carried out by a pattern matching manager ()
    else if (an object is to be image-processed on a virtual screen) then
        image processing is carried out on a virtual screen ()
    else
        image processing is carried out on a physical screen ()
    endif
end
```

FIG. 12

```
     PATTERN-MATCHING PROGRAM
begin
     a search window is set
     while (each individual seek template is moved on a rectangular spiral within the search
          window)
          while (for each of individual seek templates having rotation positions of every 5 degrees
               from -45 to 45 degrees)
               if (OK==seek step () ) then
                    if (OK==re-seek step () ) then
                         if (OK==measure step () ) then
                              if (OK==re-measure step () ) then
                                   if (OK==inspect step () ) then
                                        return (CHECK_OK_ )    // normal end
                                   else
                                        return (CHECK_NG_ )    // abnormal end
                                   endif
                              endif
                         endif
                    endif
               endif
          endwhile
     endwhile
     return (ERROR)     // abnormal end
end
```

FIG. 13

```
1   %tplModel{} {
2       %find {
3           _failCount=0;
4           _diffRate=0.9
5           %common{_hs=5.5,_l l=200,_,diff=20,_vf=PA} {
6               //  LEFT/RIGHT-EDGE CHECK
7               %linePair {_x= 32.5      _y= 27.5       _angle=0}
8               %linePair {_x= 32.5      _y=-27.5       _angle=0}
9               //  UPPER/LOWER-EDGE CHECK
10              %linePair {_x= 27.5      _y= 32.5       _angle=90}
11              %linePair {_x=-27.5      _y= 32.5       _angle=90}
12          }
13          _pitchX=2.2;
14          _pitchY=2.2;
15          _pitchA=4.5;
16          _startA=-45;
17          _endA=45;
18      }
19      %measure{
20          _failCount=0;
21          %common{_hs=3.5,_l l=200,_vf=PA} {
22              //  LEFT/RIGHT-EDGE CHECK
23              %linePair{_x=32.5,       _y=29.0,       _angle=0}
24              %linePair{_x=32.5,       _y=14.5,       _angle=0}
25              %linePair{_x=32.5,       _y= 0.0,       _angle=0}
26              %linePair{_x=32.5,       _y=-14.5,      _angle=0}
27              %linePair{_x=32.5,       _y=-29.0,      _angle=0}
28              //  UPPER/LOWER-EDGE CHECK
29              %linePair{_x=29.0,       _y=32.5,       _angle=90}
30              %linePair{_x=14.5,       _y=32.5,       _angle=90}
31              %linePair{_x= 0.0,       _y=32.5,       _angle=90}
32              %linePair{_x=-14.5,      _y=32.5,       _angle=90}
33              %linePair{_x=-29.0,      _y=32.5,       _angle=90}
34          }
35      }
36      %inspect{
37          %common{_hs=1.0,_l l=300} {
38                  %line{_x=35.0,       _y=35.0,       _angle=0}
39                  %line{_x=35.0,       _y=34.5,       _angle=0}
40                  %line{_x=35.0,       _y=34.0,       _angle=0}
                                ⋮             ⋮              ⋮
                        %line{_x=35.0,       _y=35.0,       _angle=-90,_hs=35.0,_vf=E}
                        %line{_x=37.0,       _y=35.0,       _angle=-90,_hs=35.0,_vf=E}

| P1 | P2 | P3 | P4 | P5 | P6 | P7 | P8 | P9 | P10 | P11 | P12 | P13 | P14 | P15 |
|----|----|----|----|----|----|----|----|----|-----|-----|-----|-----|-----|-----|
| 63 | 65 | 68 | 73 | 80 | 89 | 100 | 112 | 124 | 136 | 145 | 153 | 158 | 161 | 164 |

FIG. 24

| − | + |
|---|---|

FIG. 25

| − | − | − | − | + | + | + | + |
|---|---|---|---|---|---|---|---|

IMAGE PROCESSING METHOD AND APPARATUS

BACKGROUND OF THE INVENTION

1. Field of the Invention

The present invention relates to an image processing and an image processing apparatus and particularly to the art of obtaining a dimension, a position, and a rotation angle of an object by processing an image thereof.

2. Related Art Statement

The Applicant of the present application proposed an optical inspecting device in a U.S. patent application Ser. No. 09/317,845. The inspecting device includes an image taking device which takes an image of a portion, or the entirety, of an object to be inspected, and an image processing device which processes the image taken by the image taking device, and inspects the object about whether the object is present or absent, or about a dimension, a position, a rotation angle, etc. of the object. Thus, the inspecting device treats an object to be inspected, as an object to be image-processed, and checks the object about a dimension, a position, a rotation angle, etc. of the object. To this end, the inspecting device superposes a seek template or a measure template on an image of an object, and checks the image about a relative positional relationship between each pair of points of the seek template or each search line of the measure template and an edge of the image.

An edge of an image of an object is a line over which an optical characteristic (e.g., luminance) of the image significantly greatly changes. For example, in the case where the inspecting device processes a silhouette image of an object, the luminance of an inside portion of the image inside an edge thereof is significantly smaller than that of an outside portion of the image outside the edge. Therefore, if the inspecting device recognizes that one of a pair of points of the seek template is located inside the edge and the other point is located outside the edge, the inspecting device judges that that pair of points satisfies a predetermined condition. The seek template includes a plurality of pairs of points pre-set along the edge. If a predetermined number of pairs of points satisfy the predetermined condition, the inspecting device judges that the object being image-processed is an object being sought by the seek template. The measure template includes a plurality of search lines which perpendicularly intersect a plurality of straight portions of the edge, respectively. The inspecting device determines respective actual edge points where the search lines actually intersect the straight portions, respectively, and determines, based on respective relative positions between the respective actual edge points and respective reference edge points predetermined on the search lines, a dimension, a position, and a rotation angle of the object being image-processed. Thus, the inspecting device can easily seek, with the seek template, an image of an object even if the image may possibly take an actual position greatly deviated from its reference position, and can measure, with the measure template, a dimension, a position, a rotation angle, etc. of an image of an object in a short time.

However, the above-indicated image processing device measures a dimension of an image by using a measure template including only a plurality of sets of paired search lines, and measures a rotation angle of an image by using a measure template including only search lines each of which is parallel to either one of two axes of a two-dimensional orthogonal coordinate system or plane. Each set of paired search lines consists of two search lines which are located on a common straight line, have opposite directions, and are paired. The image processing device can process, with those templates, an image having a simple shape such as quadrangle or circle, and an image having such a complex shape that a major or dominant portion of its edge consists of pairs of portions each pair of which are axis-symmetric with each other or consists of straight segments each of which is parallel to either of the two axes of the coordinate system. However, some of the objects to be image-processed do not satisfy those image-shape conditions. Thus, the above-indicated image processing device cannot be sufficiently widely used.

SUMMARY OF THE INVENTION

The present invention provides an image processing method and an image processing apparatus which have one or more of the technical features that are described below in respective paragraphs given parenthesized sequential numbers (1) to (14). Any technical feature which includes another technical feature shall do so by referring, at the beginning, to the parenthesized sequential number given to that technical feature. Thus, two or more of the following technical features may be combined, if appropriate. Each technical feature may be accompanied by a supplemental explanation, as needed. However, the following technical features and the appropriate combinations thereof are just examples to which the present invention is by no means limited.

(1) According to a first feature of the present invention, there is provided a method of processing an image of an object to obtain a dimension-difference relating amount which relates to a difference of an actual dimension of the object from a reference dimension thereof, the method comprising the steps of producing a plurality of search lines each of which perpendicularly intersects a corresponding one of a plurality of substantially straight portions of an edge of the image of the object, and obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines. The dimension-difference relating amount may be the difference itself of the actual dimension of the object from the reference dimension thereof. However, it may be any other amount, such as a dimension-difference rate which is obtained by dividing the difference by the reference dimension, so long as the other amount corresponds one by one to the above-indicated difference. The dimension center is defined as a point which assures that the sum of the products of the respective edge-point deviations and the respective parallel-direction distances does not change even if the image may be moved by a small distance in any direction or may be rotated by a small angle in any direction. The small distance or the small angle is defined as a distance or an angle which assures that all the search lines continue to intersect perpendicularly the corresponding straight portions of the image, respectively. The present image processing method does not require that the search lines be parallel to the axes of a coordinate plane (e.g., a measure-template coordinate plane) on which the search lines are defined, or that the search lines be prepared as a plurality of sets of paired search lines. Therefore, the present image processing method can determine a dimension-difference relating amount of an image whatever shape its edge may have, i.e., of an image whose edge has any shape other than an axis-symmetric shape or a specific shape a major portion of which consists of straight segments each of which is parallel to either of the two axes of the coordinate plane. Thus, the present method can improve the versatility of a measure template which includes a plurality of search lines and is used to measure a dimension-difference relating amount of an object.

(2) According to a second feature of the present invention that includes the first feature (1), the image processing method further comprises determining, as the dimension center of the image of the object, a point from which a plurality of parallel vectors a sum of which is zero start, extend parallel to the search lines, respectively, and end on respective straight lines which perpendicularly intersect the search lines, respectively, at the respective reference edge points thereof. In this method, the dimension center can be easily determined.

(3) According to a third feature of the present invention that includes the first or second feature (1) or (2), the dimension-difference relating amount comprises a dimension-difference rate which is obtained by dividing the sum of the products by a sum of respective squares of the respective parallel-direction distances. The dimension-difference rate indicates that more distant portions of the image from the dimension center have greater dimension difference amounts. Therefore, the dimension-difference rate can be used to correct more rationally the dimension of the object as compared with a correction amount obtained by simply averaging the respective dimension difference amounts measured on the search lines.

(4) According to a fourth feature of the present invention, there is provided a method of processing an image of an object to obtain a rotation angle (or an angular deviation) of an actual rotation position of the object from a reference rotation position thereof, the method comprising the steps of producing a plurality of search lines each of which perpendicularly intersects a corresponding one of a plurality of substantially straight portions of an edge of the image of the object, and obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines. The rotation center is defined as a point which assures that the sum of the products of the respective edge-point deviations and the respective perpendicular-direction distances does not change even if the image may be moved by a small distance in any direction. The small distance is defined as a distance which assures that all the search lines continue to intersect perpendicularly the corresponding straight portions of the image, respectively. The present image processing method does not require that the search lines be parallel to the axes of a coordinate plane (e.g., a measure-template coordinate plane) on which the search lines are defined. Therefore, the present image processing method can determine a rotation angle (or an angular deviation) of an image whatever shape its edge may have. Thus, the present method can improve the versatility of a measure template which includes a plurality of search lines and is used to measure a rotation angle of an object.

(5) According to a fifth feature of the present invention that includes the fourth feature (4), the image processing method further comprises determining, as the rotation center of the image of the object, a point from which a plurality of perpendicular vectors a sum of which is zero start, extend perpendicularly to the search lines, respectively, and end on respective straight lines which include the search lines, respectively. In the present method, the rotation center can be easily determined.

(6) According to a sixth feature of the present invention that includes the fourth or fifth feature (4) or (5), the rotation angle is obtained by dividing the sum of the products by a sum of respective squares of the respective perpendicular-direction distances. In the present method, the rotation angle can be easily determined.

(7) According to a seventh feature of the present invention, there is provided a method of processing an image of an object to obtain a dimension-difference relating amount which relates to a difference of an actual dimension of the object from a reference dimension thereof, and obtain a rotation angle of an actual rotation position of the object from a reference rotation position thereof, the method comprising the steps of producing a plurality of search lines each of which perpendicularly intersects a corresponding one of a plurality of substantially straight portions of an edge of the image of the object, obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines, and obtaining the rotation angle based on a sum of a plurality of products each of which is obtained by multiplying a corresponding one of the respective edge-point deviations of the respective actual edge points from the respective reference edge points, in the respective directions parallel to the search lines, by a corresponding one of respective perpendicular-direction distances of the search lines from a rotation center of the image of the object in respective directions perpendicular to the search lines. The present image processing method may include at least one of the above-described second, third, fifth, and sixth features (2), (3), (5), (6). The present method can enjoys both the advantages of the method according to the first feature (1) and the advantages of the method according to the fourth feature (4). In addition, since the process needed to obtain the dimension-difference relating amount is largely common to that needed to obtain the rotation angle, the present method can reach the results in a short time.

(8) According to a seventh feature of the present invention that includes the seventh feature (7), the step of obtaining the rotation angle comprises obtaining the rotation angle, using the search lines produced based on the obtained dimension-difference relating amount. In the present method, the possibility of occurrence of failure can be reduced in the step of obtaining the rotation angle.

(9) According to a ninth feature of the present invention, there is provided a method of processing an image of an object to obtain a deviation of an actual position of the object from a reference position thereof, the method comprising the step of obtaining the deviation based on a deviation of an actual dimension center of the image of the object from a reference dimension center thereof. In the case where a designated point designated by an operator or a user as a representative point of the image of the object coincides with the reference dimension center thereof, the deviation of the actual position of the designated point of the image from the reference position thereof is equal to the deviation of the actual dimension center of the image from the reference dimension center thereof. On the other hand, in the case where the designated point is distant from the reference dimension center, the deviation of the actual position of the designated point is determined based on the deviation of the actual dimension center from the reference dimension center and the rotation angle of the actual rotation position of the image from the reference rotation position. Thus, the present method can determine the deviation of the actual position of the object based on the actual dimension center used to obtaining the dimension-difference relating amount of the image.

(10) According to a tenth feature of the present invention, there is provided a method of processing an image of an object to obtain a deviation of an actual position of the object from a reference position thereof, the method comprising the step of obtaining the deviation based on a deviation of an actual rotation center of the image of the object from a reference rotation center thereof. In the case where a designated point designated by an operator or a user as a representative point of the image of the object coincides with the reference rotation center thereof, the deviation of the actual position of the designated point of the image from the reference position thereof is equal to the deviation of the actual rotation center of the image from the reference rotation center thereof. On the other hand, in the case where the designated point is distant from the reference rotation center, the deviation of the actual position of the designated point is determined based on the deviation of the actual rotation center from the reference rotation center and the rotation angle of the actual rotation position of the image from the reference rotation position. Thus, the present method can determine the deviation of the actual position of the object based on the actual rotation center used to obtaining the rotation angle of the image.

(11) According to an eleventh feature of the present invention, there is provided an apparatus for processing an image of an object to obtain a dimension-difference relating amount which relates to a difference of an actual dimension of the object from a reference dimension thereof, the apparatus comprising search-line producing means for producing a plurality of search lines each of which perpendicularly intersects a corresponding one of a plurality of substantially straight portions of an edge of the image of the object; and product-sum obtaining means for obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines. The present image processing apparatus may be combined with at least one of the second, third, ninth, and tenth features (2), (3), (9), and (10). The present apparatus may carry out the image processing method according to the first feature (1).

(12) According to a twelfth feature of the present invention, there is provided an apparatus for processing an image of an object to obtain a rotation angle of an actual rotation position of the object from a reference rotation position thereof, the apparatus comprising search-line producing means for producing a plurality of search lines each of which perpendicularly intersects a corresponding one of a plurality of substantially straight portions of an edge of the image of the object; and product-sum obtaining means for obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines. The present image processing apparatus may be combined with at least one of the fifth, sixth, ninth, and tenth features (5), (6), (9), and (10). The present apparatus may carry out the image processing method according to the fourth feature (4).

(13) According to a thirteenth feature of the present invention, there is provided a recording medium on which an image-processing control program is recorded which is readably by a computer and is usable by the computer to process image data representing an image of an object taken by an image taking device, for obtaining a dimension-difference relating amount which relates to a difference of an actual dimension of the object from a reference dimension thereof, the image data being stored in an image-data memory, the control program comprising the steps of producing a plurality of search lines each of which perpendicularly intersects a corresponding one of a plurality of substantially straight portions of an edge of the image of the object, and obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines. The present recording medium may be combined with at least one of the second, third, ninth, and tenth features (2), (3), (9), and (10), and may be used with the image processing apparatus according to the eleventh feature (11) to carry out the image processing method according to the first feature (1).

(14) According to a fourteenth feature of the present invention, there is provided a recording medium on which an image-processing control program is recorded which is readably by a computer and is usable by the computer to process image data representing an image of an object taken by an image taking device, for obtaining a rotation angle of an actual rotation position of the object from a reference rotation position thereof, the image data being stored in an image-data memory, the control program comprising the steps of producing a plurality of search lines each of which perpendicularly intersects a corresponding one of a plurality of substantially straight portions of an edge of the image of the object, and obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines. The present recording medium may be combined with at least one of the fifth, sixth, ninth, and tenth features (5), (6), (9), and (10), and may be used with the image processing apparatus according to the twelfth feature (12) to carry out the image processing method according to the fourth feature (4).

DETAILED DESCRIPTION OF THE PREFERRED EMBODIMENTS

The above and optional objects, features, and advantages of the present invention will be better understood by reading the following detailed description of the preferred embodiments of the invention when considered in conjunction with the accompanying drawings, in which:

FIG. 11 is a view representing a preliminary processing program which is stored in a dynamic random access memory ("DRAM") of the image processing device;

FIG. 12 is a view representing an image processing program which is stored in the DRAM of the image processing device;

FIG. 13 is a view representing a pattern matching program which is stored in the DRAM of the image processing device;

FIG. 14 is a view showing pre-stored data which are used to carry out the pattern matching program on a square image of an object;

FIG. 23 is a table showing respective calculated luminance values corresponding to the division points shown in FIG. 22;

FIG. 24 is a view of explaining a differential filter which is used to differentiate the calculated luminance values shown in FIG. 23;

FIG. 25 is a view of explaining another differential filter which is used to differentiate the calculated luminance values shown in FIG. 23;

DETAILED DESCRIPTION OF THE PREFERRED EMBODIMENTS

Hereinafter, there will be described an optical measuring apparatus to which the present invention is applied. The present optical measuring apparatus can measure a dimension, a position, and a rotation angle of a solid or cubic object, and judges whether the measured dimension is appropriate. The present apparatus takes an image of the object, measures a dimension, a position, and/or a rotation angle of the object, based on the taken image, and judges whether the thus measured dimension is appropriate or not.

Figure 8:
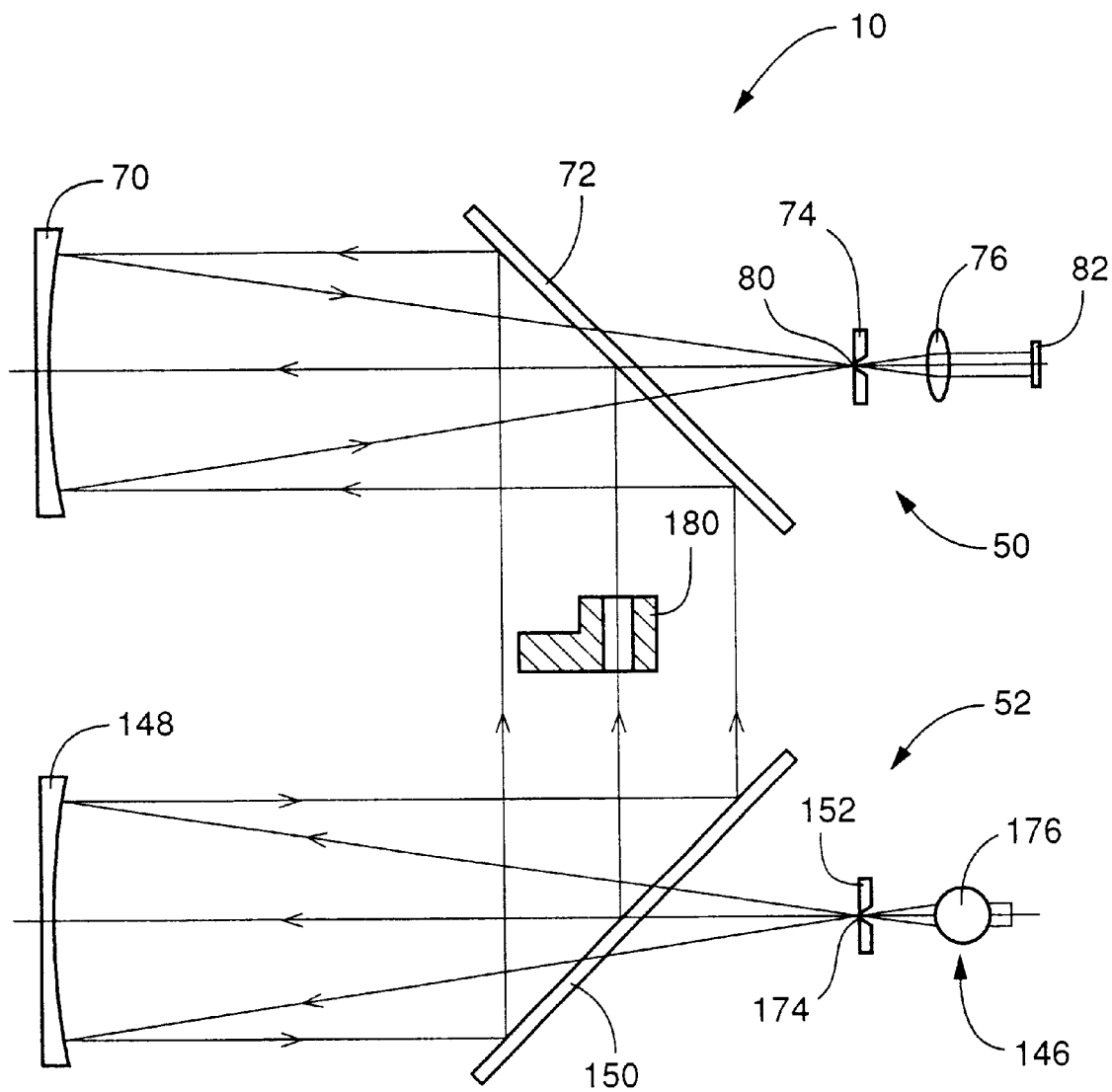
FIG. 8 is a schematic view of the image taking device of FIG. 1.
Figure 9:
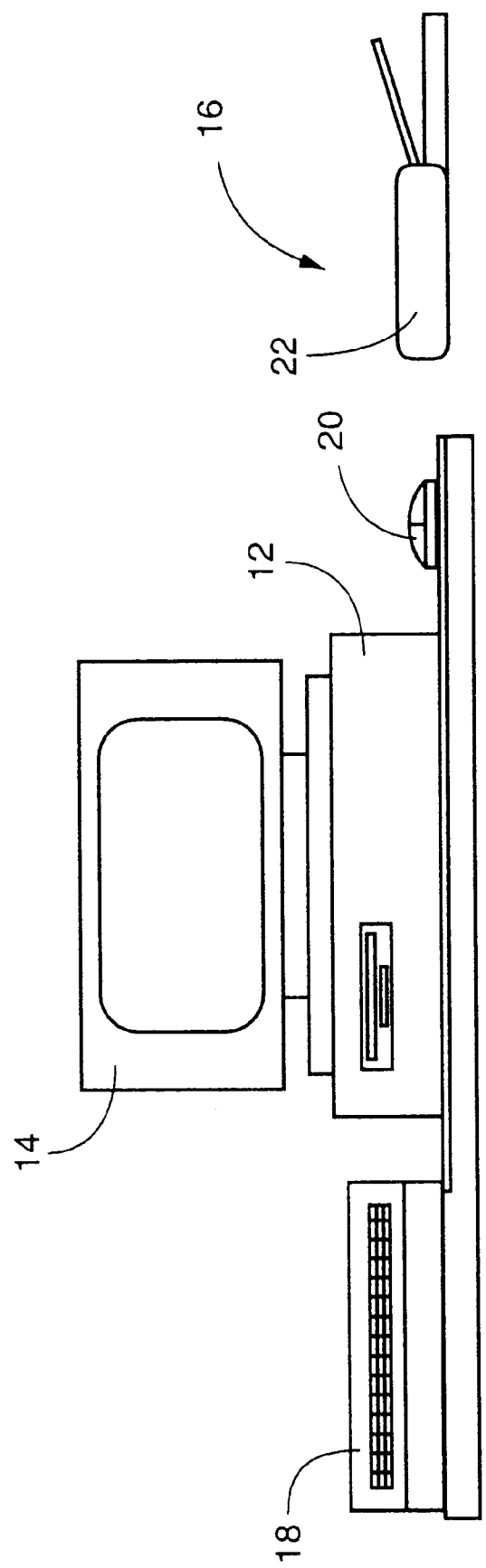
FIG. 9 is a front elevation view of the image processing device, a monitor device, and an input device of the optical measuring apparatus.

The present optical measuring apparatus includes an image taking device 10 which is shown in FIGS. 1 to 8, and an image processing device 12, a monitor device 14, and an input device 16 which are shown in FIG. 9. The input device 16 includes a keyboard 18, a mouse 20, and a foot switch 22. The image processing device 12 operates in response to information and commands input through the input device 16. More specifically described, the image processing device 12 processes image data representing an image taken by the image taking device 10, determines a dimension-difference relating amount of a solid object, a positional difference or deviation of an actual position of the object from a reference position thereof, and an angular difference or deviation of an actual rotation position of the object from a reference rotation position thereof, and judges whether the object has an appropriate dimension, based on the determined dimension-difference relating amount. The dimension difference may be a dimension error, but is not limited to it. For example, the dimension difference may be an expected dimension change. The dimension-difference relating amount is an amount relating to the dimension difference, and may be the dimension difference itself. However, as far as the present embodiment is concerned, the dimension-difference relating amount is defined as a ratio of the dimension difference obtained by subtracting an actual dimension from a reference dimension, to the reference dimension. This ratio will be referred to as the "dimension-difference rate". The positional difference or deviation may be a positional error but is not limited to it. For example, the positional deviation may be an expected position change. Likewise, the angular difference or deviation may be an angular error but is not limited to it. For example, the angular deviation may be an expected angular change. The monitor device 14 as a display device displays the measurement results and the judgment results. The image processing device 12 may be connected to a printer (not shown) which records the screen image displayed on the monitor device 14, on a recording sheet as a sort of recording medium.

The information needed to operate the image processing device 12 is input through the keyboard 18 and the mouse 20. However, simple commands, such as an operation-start command, can be input through each of the keyboard 18, the mouse 20, and the foot switch 22. In a particular case where a great number of solid objects are successively measured by the present measuring apparatus, it is preferred that the operation-start command is input through the foot switch 22, because an operator can use his or her two hands in a different operation, such as an object replacing operation in which the current object is replaced with a new one. In addition, if the present measuring apparatus cannot carry out a measurement on an object, or judges that an object has an inappropriate dimension, a buzzer (not shown) incorporated in the image processing device 12 generates an alarm sound. Thus, the operator does not have to keep watching the monitor device 14. In this respect, too, the present measuring apparatus enjoys high versatility.

Figure 1:
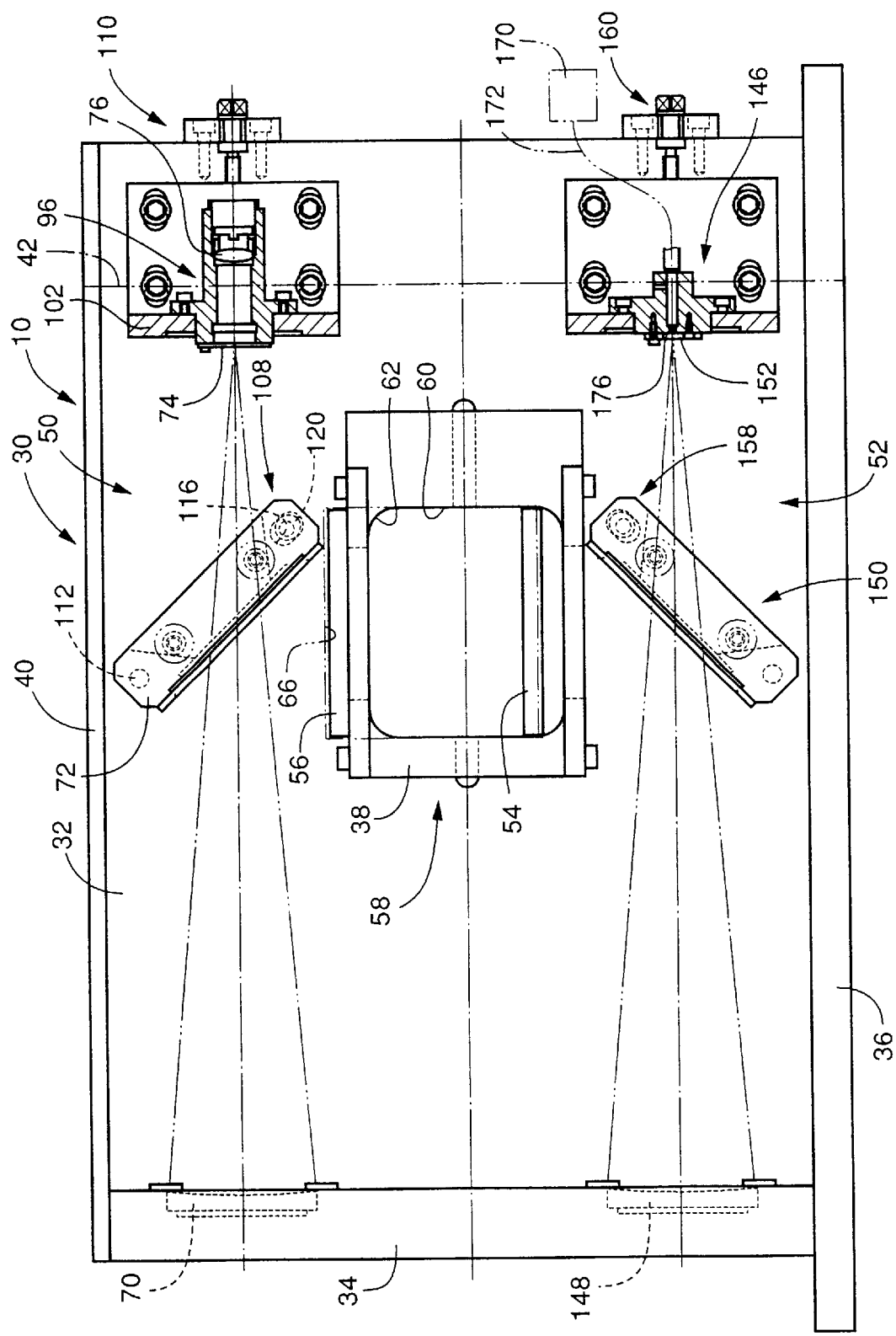
FIG. 1 is a front elevation view of an image taking device of an optical measuring apparatus which additionally includes an image processing device to which the present invention is applied.
Figure 2:
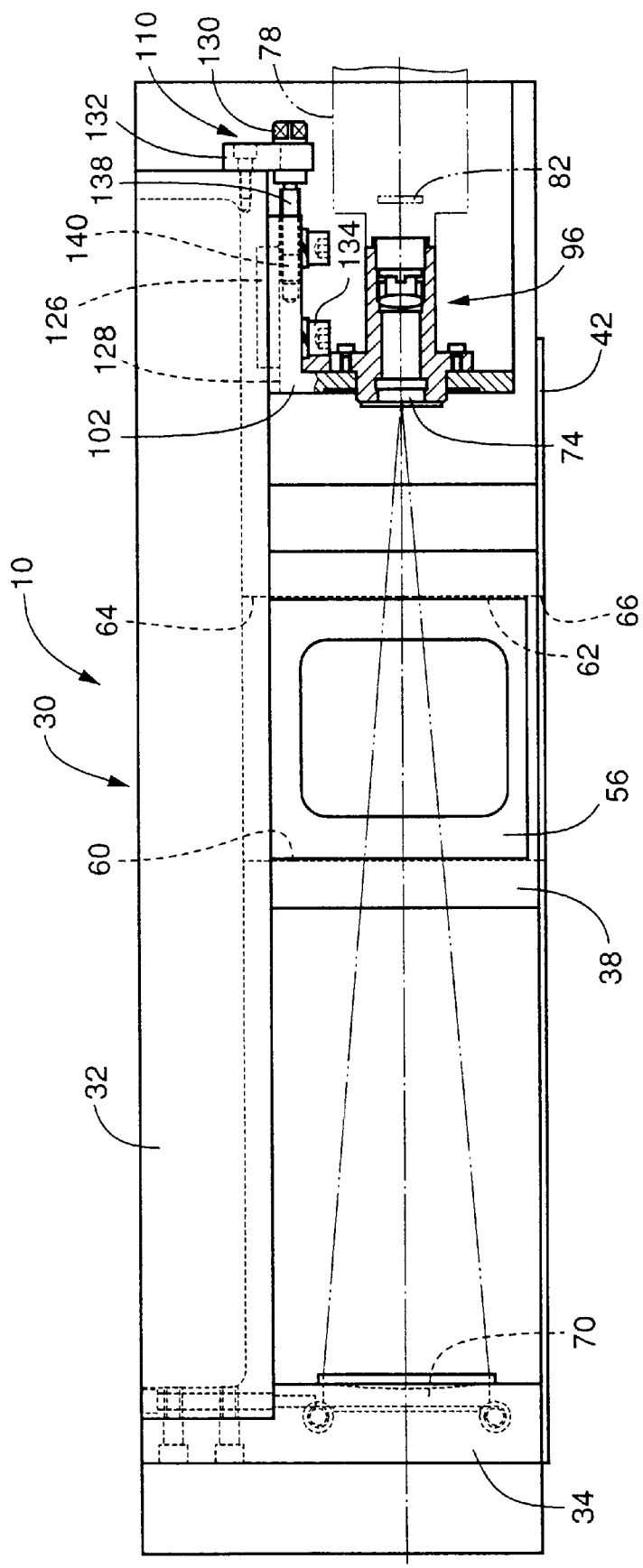
FIG. 2 is a plan view of the image taking device of FIG. 1.
Figure 3:
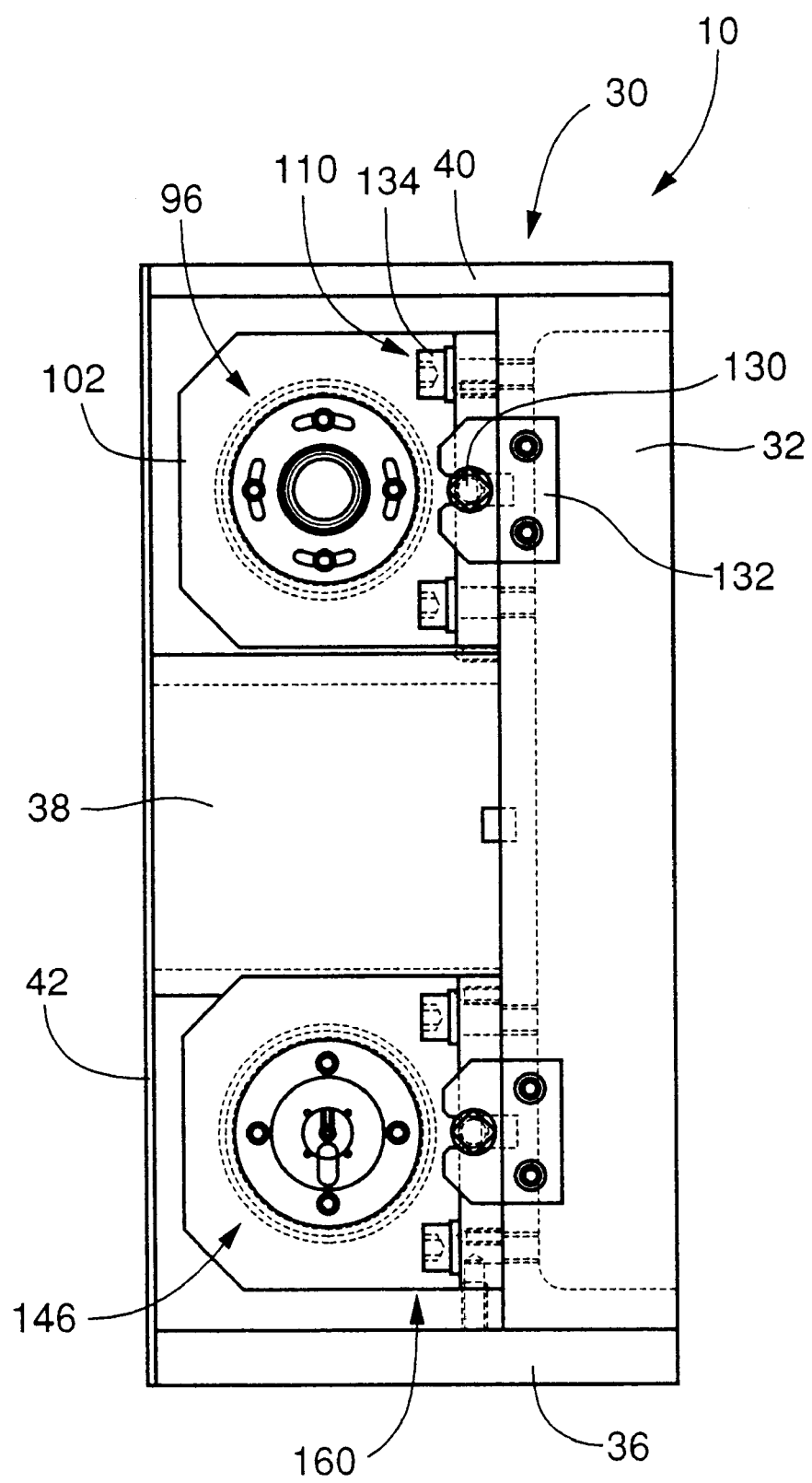
FIG. 3 is a right-hand side elevation view of the image taking device of FIG. 1.

Next, the image taking device 10 will be described in detail by reference to FIGS. 1 to 8. The image taking device 10 has an abstract construction shown in FIG. 8, and has a concrete construction shown in FIGS. 1 to 7. In FIGS. 1 to 3, reference numeral 30 designates a main frame of the image taking device 10. The main frame 30 is assembled from a plurality of members and has a rectangular box-like shape as a whole.

The main frame 30 includes, as a first member, a vertical support wall 32. Another support wall 34 is fixed to a vertical side surface of the first support wall 32. A base plate 36 is fixed to respective lower ends of the two support walls 32, 34. A central frame 38 is fixed to a central portion of the first support wall 32. A first cover member 40 is fixed to respective upper ends of the two support walls 32, 34, and a second cover member 42 is fixed to fixed to the first cover member 40 and the base plate 36 so as to extend parallel to the first support wall 32. Thus, the main frame 30 has a box-like structure opening in one side only. In FIG. 1, the second cover member 42 is not shown and only the position thereof is indicated at two-dot chain line. FIG. 2 shows that the first support wall 32 is provided by a shallow box-like member which has a plurality of reinforcing ribs (not shown) inside. In FIG. 2, the first cover member 40 and a beam splitter 72 (FIG. 1) are not shown for easier understanding purposes only.

The main frame 30 incorporates an image taking section 50 and a parallel-ray generating section 52. The image taking section 50 includes an object supporting device 58 including the central frame 38 and two glass plates 54, 56. The central frame 38 has a vertical through-hole 60 formed through the thickness thereof in a vertical direction. The two glass plates 54, 56 are provided in lower and upper openings of the through-hole 60. The central frame 38 additionally has a horizontal through-hole 62 formed through the thickness thereof in a horizontal direction perpendicular to the first support wall 32 and the second cover member 42. The support wall 32 has an opening 64 corresponding to one end of the second through-hole 62, and the cover member 42 has an opening 66 corresponding to the other end of the through-hole 62. The parallel-ray generating section 52 has such a construction (described later) which generates parallel rays travelling through the first through-hole 60 in an upward direction. When the operator inserts a solid object through the opening 66 of the second cover member 42 and puts the object on the lower glass plate 54, the back or bottom side of the object is lighted by the parallel rays. Thus, the image taking device 10 takes a silhouette, whole image of the object. The opening 64 of the support wall 32 is formed for permitting a long object to be inserted into the central frame 38.

The image taking section 50 includes, in addition to the object supporting device 58, a concave mirror 70, the beam splitter 72, an orifice member 74, a lens system 76, and a CCD (charge-coupled device) camera 78 (FIG. 2). The concave mirror 70 is a parabolic mirror that reflects rays incident thereto parallel to its optical axis, toward its focal point. The concave mirror 70 is fixed to the second support wall 34, such that a pin hole 80 (FIG. 8) of the orifice member 74 is located at the focal point of the mirror 70. The beam splitter 72 is provided between the concave mirror 70 and the orifice member 74. The beam splitter 72 is supported by the first support wall 32 such that the splitter 72 is located at the intersection point of the central line of the vertical through-hole 60 of the central frame 38 and the optical axis of the concave mirror 70, and is inclined by 45 degrees with respect to the central line and the optical axis. The beam splitter 72 transmits a portion of the rays incident thereto and reflects the remaining portion of the same. As shown in FIG. 8, a portion of the parallel rays, generated by the generating section 52 and passed through the vertical through-hole 60 of the central frame 38, that is reflected by the beam splitter 72 is incident to the concave mirror 70. Since the rays reflected by the beam splitter 72 are incident to the concave mirror 70, in a direction substantially parallel to the optical axis of the mirror 70, the rays are converged at the focal point of the mirror 70.

After the converged rays pass through the pin hole 80 of the orifice member 74, and radially expand, the rays are converted by the lens system 76 into parallel rays, because the focal point of the lens system 76 coincides with that of the concave mirror 70. The orifice member 74 has the function of transmitting only a portion of the rays incident to the concave mirror 70 (i.e., the rays passed around the object) that is parallel to the optical axis of the mirror 70, and rejecting the remaining portion of the rays. This function is improved by employing a smaller pin hole 80. If the pin hole 80 were a mathematical or theoretical point having no area, only the rays strictly parallel to the optical axis could pass through the pin hole 80. In fact, however, the pin hole 80 cannot help having a small area. Therefore, some rays which are more or less inclined relative to the optical axis also pass through the hole 80. Thus, those rays that are strictly or substantially parallel to the optical axis of the concave mirror 70 form an image on an imaging surface defined by a matrix of CCDs 82 (FIG. 2 or FIG. 8) as the imaging elements of the CCD camera 78. Hence, in order to form a very clear image on the CCDs 82, it is required that the matrix of CCDs 82 be located at the other focal point of the lens system 76 that is opposite to the one focal point thereof located at the pin hole 80. The CCDs (charge-coupled devices) 82 are photoelectric transducers, and each CCD 82 generates an electric signal corresponding to the intensity of light incident thereto, in relation with the position thereof in the matrix of CCDs.

The orifice member 74 and the lens system 76 are assembled into a common tubular member to provide an integral optical system. The present optical measuring apparatus can selectively employ any one of three sorts of optical systems 96, 98, 100 shown in FIGS. 5, 6, and 7, respectively. The three optical systems 96, 98, 100 include a long, an intermediate, and a short tubular member 90, 92, 94, respectively, which have different lengths, and have a small, a medium, and a large field of view, respectively, which correspond to different applications or uses. Any one of the three optical systems 96, 98, 100 is selected and attached to the main frame 30. In view of this, the optical systems 96, 98, 100 will be referred to as the replaceable lens systems. Each replaceable lens system 96, 98, 100 is attached to the main frame 30 via a bracket 102, and the CCD camera 78 is detachably attached, by screwed or threaded engagement, to a rear end of the lens system 96, 98, 100.

It is required that the direction in which the parallel rays are incident to the concave mirror 70 be accurately parallel to the optical axis of the mirror 70 and that the pin hole 80 of the orifice member 74 be accurately located at the focal point of the mirror 70. To this end, the image taking device 10 employs an inclination-angle adjusting device 108 which adjusts the angle of inclination of the beam splitter 72, and a position adjusting device 110 which adjusts an axial-direction position of each replaceable lens system 96, 98, 100 along the optical axis of the mirror 70.

Figure 4:
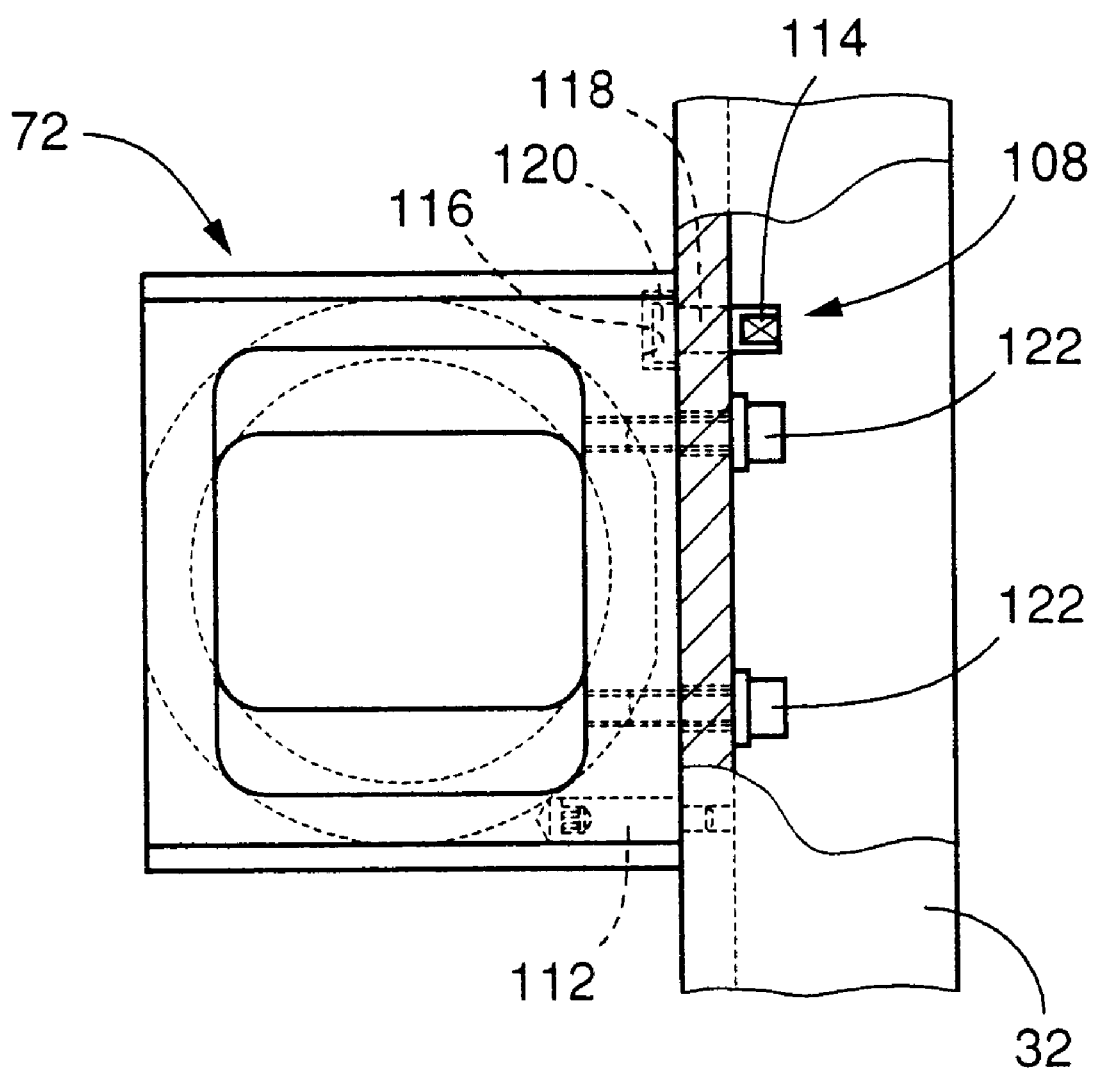
FIG. 4 is a partly cross-sectioned, side elevation view of a beam splitter of the image taking device of FIG. 1.
Figure 5:
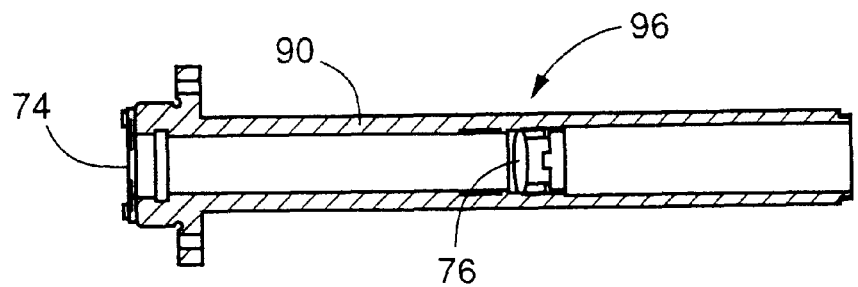
FIG. 5 is a cross-sectioned, front elevation view of a replaceable lens system of the image taking device of FIG. 1.
Figure 6:
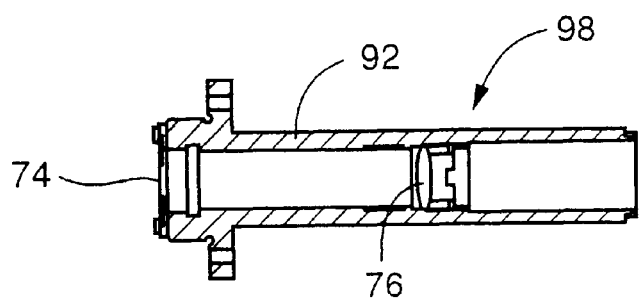
FIG. 6 is a cross-sectioned, front elevation view of another replaceable lens system of the image taking device of FIG. 1.
Figure 7:
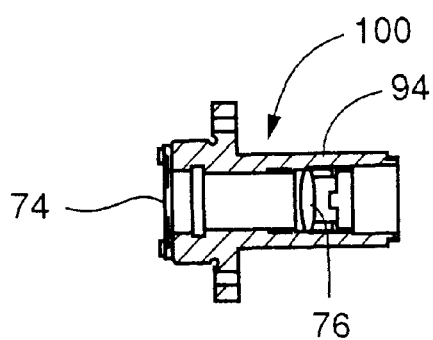
FIG. 7 is a cross-sectioned, front elevation view of yet another replaceable lens system of the image taking device of FIG. 1.

As shown in FIG. 4, the inclination-angle adjusting device 108 includes an axis member 112, an eccentric operable member 114, and an elongate hole 116. The axis member 112 is perpendicularly fixed to the first support wall 32, and supports the beam splitter 72 such that the splitter 72 is pivotable about an axis line of the axis member 112 that is perpendicular to both the central line of the vertical through-hole 60 of the central frame 38 and the optical axis of the concave mirror 70. The eccentric operable member 114 includes an axial portion 118 which is held by the support wall 32 such that the operable member 114 is pivotable about an axis line parallel to that of the axis member 112, and additionally includes an eccentric cam portion 120 which is eccentric with respect to the axial portion 118 and which fits in the elongate hole 116 formed in the beam splitter 72. The elongate hole 116 is elongate in a direction perpendicular to the axis line of the axis member 112 about which the beam splitter 72 is pivotable. Since the eccentric cam portion 120 fits in the elongate hole 116 such that the cam portion 120 is substantially immovable in its widthwise direction relative to the hole 116, the beam splitter 72 is pivoted about the axis line of the axis member 112 as the eccentric operable member 114 is rotated by the operator. Thus, the angle of inclination of the beam splitter 72 relative to the optical axis of the concave mirror 70 can be adjusted. After this angle adjustment, the beam splitter 72 is fixed to the support wall 32 with bolts 122.

As most clearly shown in FIG. 2, the position adjusting device 110 includes, in addition to the bracket 102, a key member 126, a key groove 128, an adjusting screw 130, and an adjusting-screw holding member 132. The key member 126 is fixed to the main frame 30 so as to extend parallel to the optical axis of the concave mirror 70, and functions as a guide member. The key member 126 fits in the key groove 128 formed in the bracket 102. The bracket 102 is fixed to the main frame 30 with a plurality of bolts 134. In the state in which the bolts 134 are loosened, those bolts 134 permit the bracket 102 to be moved relative to the main frame 30 and prevent the bracket 102 from being excessively moved away from the same 30. Thus, the bracket 102 is movable in only directions parallel to the optical axis of the concave mirror 70. The adjusting screw 130 is held by the adjusting-screw holding member 132 that is fixed to the main frame 30 and provides part of the same 30, such that the adjusting screw 130 is rotatable about its axis line and is immovable in its axial direction. The adjusting screw 130 includes an externally threaded portion 138 which is screwedly or threadedly engaged with an internally threaded portion 140 of the bracket 102. When the adjusting screw 130 is rotated by the operator, the bracket 102 is moved along the key member 126 so as to adjust the axial-direction position of the replaceable lens system 96, 98, 100 and the CCD camera 78 that are supported by the bracket 102. When the pin hole 80 of the orifice member 74 is just located at the focal point of the concave mirror 70, the bolts 134 are fastened to fix the axial-direction position of the lens system 96, 98, 100. The adjusting screw 130 may be replaced with a different sort of screw including two externally threaded portions which have different threading directions or different threading pitches and which are threadedly engaged with respective internally threaded portions of the bracket 102 and the main frame 30.

Next, the parallel-ray generating section 52 will be described. The generating section 52 has a construction which is plane-symmetric with the image taking section 50 except that the former section 52 includes a light-source device 146 in place of the lens system 76 and the CCD camera 78 of the latter section 50. More specifically described, the generating section 52 includes a concave mirror 148, a beam splitter 150, and an orifice member 152 which are plane-symmetric with the concave mirror 70, the beam splitter 72, and the orifice member 74 of the image taking section 50, respectively, with respect to a horizontal plane passing though the vertically middle portion of the object supporting device 58. The generating section 52 includes an inclination-angle adjusting device 158 and a position adjusting device 160 which have the same constructions as those of the two adjusting devices 108, 110 of the image taking section 50.

The light-source device 146 includes a halogen lamp 170 as a light source, a glass fiber which transmits the rays emitted by the halogen lamp 170, and a ball lens 176 as a lens system which converges the substantially parallel rays emitted from one end of the glass fiber 172, to a pin hole 174 of the orifice member 152. The rays converged by the ball lens 176 radially expand after passing through the pin hole 174. Thus, the light-source device 146 functions as a point light source. The beam splitter 150 reflects a portion of the rays radiated from the pin hole 174, and transmits the remaining portion of the same so as to be incident to the concave mirror 148. Since the pin hole 174 is located at the focal point of the concave mirror 148, the rays radiated from the pin hole 174 are converted by the mirror 148 into parallel rays parallel to the optical axis of the mirror 148. The parallel rays are reflected by the beam splitter 150 toward the object supporting device 58.

Figure 44:
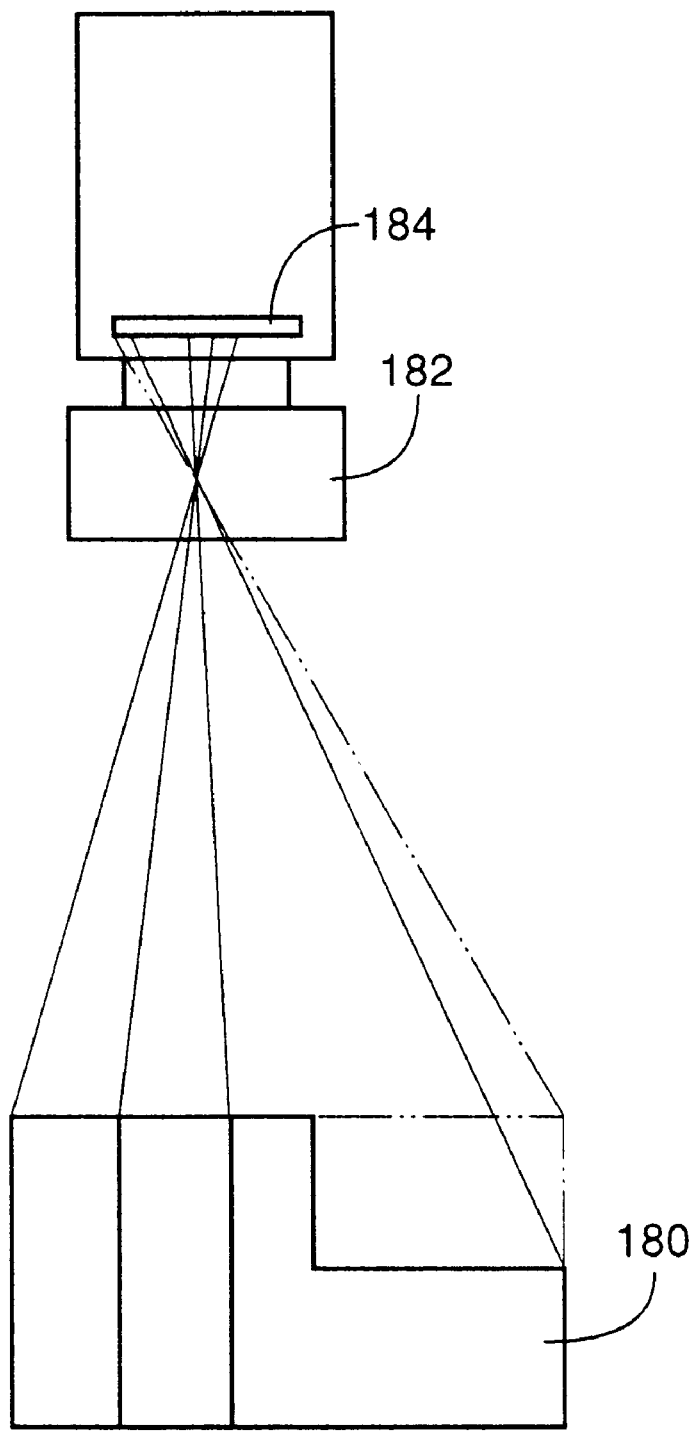
FIG. 44 is a schematic view of a prior image taking device including a conventional optical system.

Since the image taking device 10 is constructed as described above, the parallel rays generated by the generating section 52 pass through the object supporting device 58 in an upward direction parallel to the central axis line of the vertical through-hole 60. Therefore, when a solid object 180 (FIG. 8) is placed on the lower glass plate 54 of the object supporting device 58, the object 180 interrupts a portion of the parallel rays, while permitting the remaining portion of the rays to pass around the object 180. The rays which have passed around the object 180 form a silhouette, whole image of the object 180, on the matrix of CCDs 82 of the CCD camera 78, as described previously. The silhouette image of the object 180 includes a dark image of the object 180 and a light image of the background of the image 180. Since the light image of the background is formed by the parallel rays which have passed around the object 180, the dark or silhouette image of the object 180 is formed as if it were drawn by projection, or perspective projection. FIG. 44 shows a common optical system 182, and a matrix of CCDs 184 which takes an image of the solid object 180 through the optical system 182. The taken image of the object 180 has the problem that a portion of the object 180 that is distant from the optical system 182 is imaged smaller than the remaining portion of the object 180 that is near to the optical system 182. More specifically described, if the distant portion of the object 180 were located, as indicated at two-dot chain line, at the same distance as that at which the remaining portion of the object 180 is located, the distant portion would be imaged in the same size as that in which the remaining portion is imaged. In fact, however, the distant portion is imaged smaller than the remaining portion. This problem will occur so long as an entire outer surface of the object 180 that is opposed to the optical system 182 is not provided by a single surface which is perpendicular to the optical axis of the system 182 and whose position is fixed relative to the system 182. Therefore, this problem makes it impossible to accurately measure the dimensions of the solid object 180. In contrast, the image taking device 10 is free from this problem, and an image of the solid object 180 is taken by the device 10 as if it were drawn by projection or perspective projection. Accordingly, the dimensions of the solid object 180 can be accurately measured on the taken image, as if they were measured on a projected or perspective-projected drawing.

The above-described image taking device 10 may be replaced with another sort of image taking device disclosed in, e.g., U.S. patent application Ser. No. 09/317,845 assigned to the Assignee of the present application. Alternatively, the image taking device 10 may be replaced with such an image taking device which lights, with a lighting device, a front surface of a solid object and takes the front image of the object. In this case, the taken front image of the object may include an image of a recess or a projection present on the front surface of the object, an image of a character printed on the surface, or an image of a defect such as a scar occurring to the surface or dirt adhered to the surface. In the last case, the recess, the projection, the character, the scar, or the dirt can be treated as an object to be measured.

Next, the image processing device 12 will be described. The processing device 12 processes image data representing the image which is taken by the CCD camera 78 in the above-described manner, identifies the outer and/or inner outlines (i.e., edge lines) of the image of the solid object 180, and determines, based on the identified outlines, a dimension-difference relating amount, a positional deviation, and a rotation angle of the object 180. The rotation angle of the object 180 is the angular difference of its actual rotation position from its reference rotation position. The method of processing the image of the object 180 is very complex and accordingly will be described in detail later. The image processing device 12 compares the thus obtained dimension-difference relating amount with a reference amount or data, and judges whether the object 180 has an appropriate dimension. The positive or negative judgment is displayed, on the monitor device 14, together with the obtained dimension-difference relating amount of the object 180.

The image processing device 12 may be used as an image processing device of an electric-component ("EC") mounting system including an EC supplying device and an EC holding head (e.g., an EC suction head) which receives an EC from the EC supplying device, holds the EC, conveys the EC, and mounts the EC on a circuit substrate ("CS") (e.g., a printed circuit board) supported by a CS supporting device. The EC mounting system measures an X-direction position, a Y-direction position, and a rotation angle of the EC held by the EC holding head, and also measures those of the CS supported by the CS supporting device. After the EC mounting system corrects errors of the actual X-direction and Y-direction positions and the actual rotation position of each of the EC and the CS, the EC mounting head mounts the EC on the CS. To this end, the EC mounting system employs an image taking device which takes an image of the EC and respective images of reference marks of the CS. The image processing device 12 can be used one which processes each image taken by the image taking device.

Figure 10:
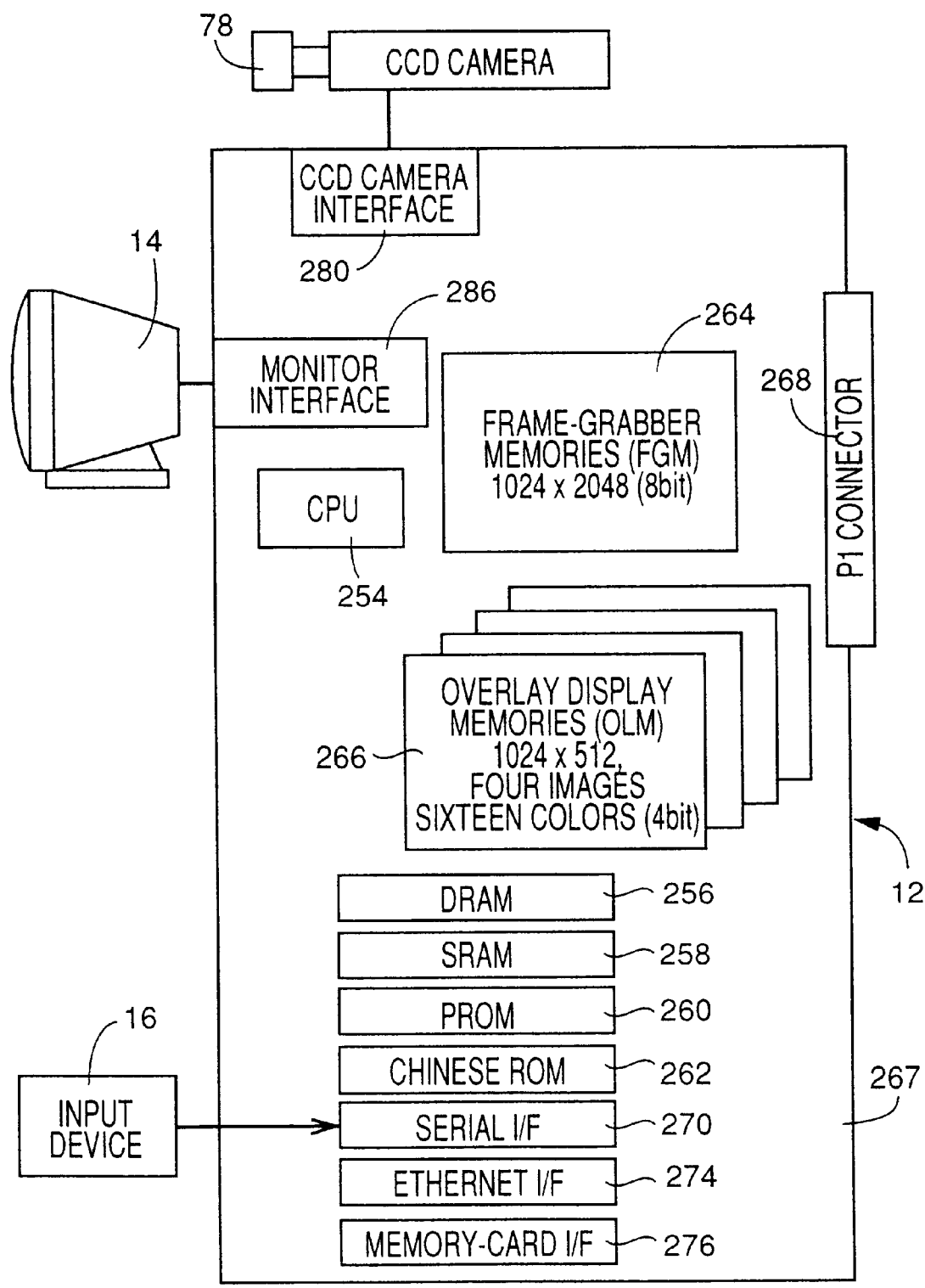
FIG. 10 is a diagrammatic view of the image processing device of FIG. 9.

The image processing device 12 is essentially provided by a computer which includes, as shown in FIG. 10, a central processing unit ("CPU") 254, a dynamic random access memory ("DRAM") 256, a static random access memory ("SRAM") 258, a programmable read only memory (PROM) 260, a Chinese-letter read only memory 262 (hereinafter, referred to as the "Chinese ROM" 262), four frame-grabber memories ("FGMs") 264, and four overlay display memories ("OLMs") 266, all of which are connected to one another via an internal bus (not shown) which is provided on a common circuit substrate 267.

A two-channel serial interface 270 is also connected to the above-indicated internal bus, and the input device 16 is connected to the serial interface 270. The input device 16 includes the keyboard 18 having alphanumeric keys, and is used to input, into the computer, the information and commands needed to operate the optical measuring apparatus as a whole, and the information needed to process respective images of objects 180, e.g., the sort, and/or total number, of the objects 180 to be image-processed (what is image-processed may be either an entire object 180, or a particular portion of an object 180). An Ethernet interface 274 and a memory-card interface 276 are also connected to the internal bus.

The Ethernet interface 274 is for communicating with another computer which controls an apparatus, such as the above-described EC mounting system, other than the image processing device 12. The image processing device 12 may be connected to an optional control device, and the Ethernet interface 274 is used for exchanging data with the control device via a P1 connector 268. For example, in the case where the optical measuring apparatus is used with the above-mentioned EC mounting system, various sorts of drive devices of the mounting system are controlled by a second computer independent of the first computer of the image processing device 12, and the second computer is connected to the P1 connector 268 via an external bus (not shown). However, since the second computer is not relevant to the present invention, the description and illustration thereof is omitted.

When a memory card in which the control programs prepared in advance to control the image processing operation are pre-stored is inserted in the image processing device 12, the CPU 254 utilizes the PROM 260 to read, from the memory card inserted, the control programs and the data needed to carry out the programs, via the memory-card interface 276, and stores the thus read programs and data in the DRAM 256.

A CCD-camera interface 280 is also connected to the internal bus. The CCD camera 78 of the image taking device 10 (or the CCD camera of the EC mounting system) is connected to the CCD-camera interface 280. A batch of image data representing an image taken by the CCD camera 78 is stored in one of the FGMs 264 via the CCD-camera interface 280. As described above, the image processing device 12 includes the four FGMs 264, and four bathes of image data successively obtained from four objects 180 are sequentially stored in the four FGMs 264, respectively.

A monitor interface 286 is also connected to the internal bus of the image processing device 12, and the monitor device 14 is connected to the monitor interface 286. The monitor device 14 can display both a full-color image and a monochromatic image. Four batches of image data obtained by taking respective monochromatic images of four objects 180 are stored in the four FGMs 264, respectively, and the four OLMs 266 store four batches of image data representing four sixteen-color images, respectively. The monitor device 14 displays a selected one of the four monochromatic images, superposes one of the four sixteen-color images that corresponds to the selected monochromatic image, and thereby displays the current state, or results, of the image processing operation. For example, in a seek or measure step described later, the monitor device 14 displays a monochromatic image including an object 180 being image processed and its background, based on a batch of image data stored in one of the four FGMs 164, and superposes, on the monochromatic image, a color image of each of individual seek or measure templates having different rotation angles and/or positions such that the individual templates are sequentially displayed one after another while being moved along a "rectangular" spiral line. Thus, the operator can observe the current state of the image processing operation.

The monitor device 14 also displays color images corresponding to the data input through the input device 16, while utilizing the Chinese ROM 262 of the image processing device 12. The monitor device 14 is operable in one of two operation modes, i.e., an automatic selection mode and a manual selection mode. When the monitor device 14 operates in the automatic selection mode, the device 14 can selectively display the current state of the image processing device 12 and the input-related data which are related to the data input through the input device 16 or the data produced by the computer in relation to the input data, while giving priority to the input-related data. Therefore, if the operator inputs some data through the input device 16 when the monitor device 14 is in the automatic selection mode, the device 14 automatically switches itself from displaying the current state of the image processing operation to displaying the input-related data. While the manual selection mode is selected on the monitor device 14, the device 14 displays only one of the above-indicated two sorts of information that is currently selected by the operator through his or her operation of the input device 16.

Hereinafter, there will be described the operation of the image processing device 12 for processing a batch of image data representing an image taken by the CCD camera 78.

As described above, the control programs and data needed to process images are stored in the memory card and, when the memory card is set in a card reader (not shown) of the image processing device 12, the programs and data are read from the memory card and are stored in the DRAM 256. The control programs read from the memory card are shown in FIGS. 11, 12, and 13. According to those programs, the image processing device 12 measures a dimension-difference relating amount, a position deviation, and/or a rotation angle of an object 180, and judges whether the object 180 has an appropriate dimension.

FIG. 11 shows a preliminary processing program, which is carried out when an object inspecting program is started, i.e., immediately after the preliminary processing program is stored in the DRAM 256. First, it is judged whether a pattern matching is to be performed with respect to one of all objects 180 that are needed to carry out the object inspecting program. If a positive judgment is made with respect to the one object 180, individual seek templates are produced based on a master seek template, and are stored in the DRAM 126. A similar operation is sequentially performed with respect to each of the other objects 180 to be image-processed.

The above-mentioned master seek template is defined by a plurality of pairs of points which are located on an X-Y coordinate system or plane (hereinafter, referred to as the "master-seek-template coordinate plane"). The master-seek-template coordinate plane coincides with a reference coordinate plane of the image processing device 12. That is, the origin and X and Y axes of the master-seek-template coordinate plane coincide with those of the reference coordinate plane, i.e., the center of the field of view of the CCD camera 78 and the two orthogonal coordinate axes of the field of view. A batch of seek-template data representing a master seek template is prepared in advance based on the shape and dimensions of an object 180, and is stored in the memory card. When the preliminary processing program is read, the batch of seek-template data is read from the memory card and is stored with the preliminary processing program in the DRAM 256.

Figure 15:
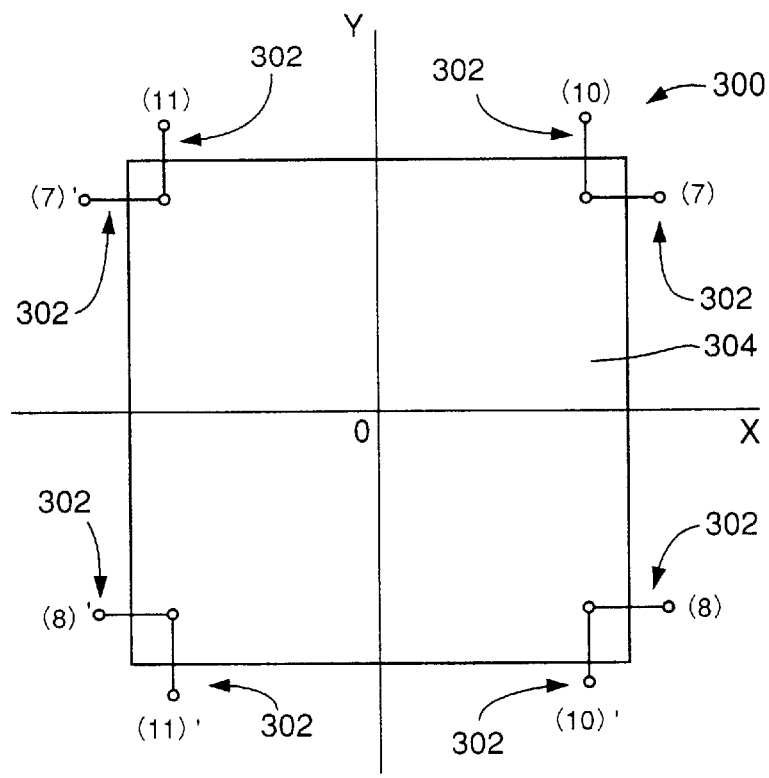
FIG. 15 is a view showing a master seek template defined by the pre-stored data shown in FIG. 14, together with the square image.

FIG. 14 shows an example of a batch of seek-template data which represents a master seek template 300, shown in FIG. 15, which is prepared to seek a square image 304 of an object 180. In FIG. 14, the batch of seek-template data are provided by Lines 7, 8, 10, and 11, and "hs=5.5" of Line 5. The term "hs" (half span) means half the distance between each pair of points 302. The term "Pair" indicates that another pair of points 302 are located on a straight line extended from a straight segment connecting between a related pair of points 302, such that the another pair of points 302 are symmetric with the related pair of points 302 with respect to an appropriate one of the X axis, the Y axis, and the origin of the master-seek-template coordinate plane. For example, FIG. 15 shows four original pairs of points 302 {(7), (8), (10), (11)} corresponding to Lines 7, 8, 10, and 11 shown in FIG. 14, and four symmetric pairs of points 202 {(7)', (8)', (10)', (11)'}. Respective parenthesized numbers assigned to the pairs of points 302, shown in FIG. 15, correspond to the respective numbers assigned to the lines, shown in FIG. 14, that define those pairs of points.

A master template is formed or produced, as shown in FIG. 15, such that one of each pair of points 302 is located inside an edge (or outline) of a reference object which has no dimension errors, no X-direction or Y-direction position error, or no rotation-position error, the other point is located outside the edge of the reference object, and the middle point of each pair of points 302 is located just on the edge of the reference object.

However, generally, it is not essentially required that the middle point of each pair of points 302 of a master seek template 300 be located on an edge of a reference object, so long as the two points 302 of each pair are located inside and outside the edge of the reference object, respectively.

In the example shown in FIG. 15, each pair of points 302 include one point common to another pair of points 302. However, this is not an essential feature, either.

In FIG. 15, the two points 302 of each pair are connected by a straight segment, for easier understanding purposes only, and no data corresponding to those segments are included in the batch of seek-template data shown in FIG. 14.

Figure 17:
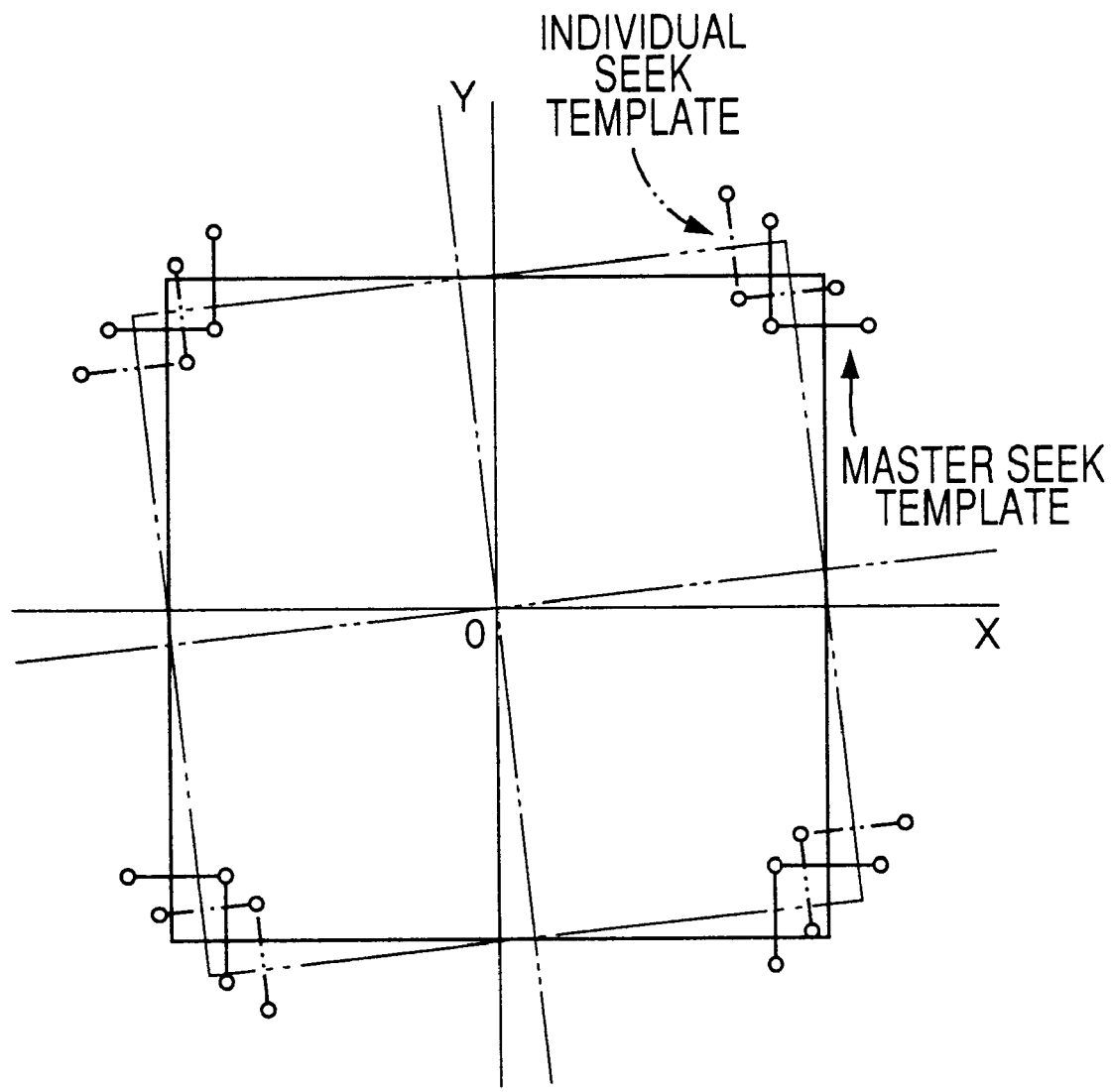
FIG. 17 is a view for explaining a manner in which an individual seek template is produced based on the master seek template.

In the present embodiment, what is to be image-processed may be the entirety of an image of an object 180 to be measured or inspected, and a plurality of batches of seek-template data may be prepared in advance, and stored in the memory card, for the purpose of seeking a plurality of sorts of objects 180, respectively. When an image processing operation is performed, all the batches of seek-template data are read from the memory card and are stored in the DRAM 256. Accordingly, when a certain sort of object 180 is sought, a batch of seek-template data corresponding to that sort of the object 180 is read from the DRAM 256, and a plurality of individual seek templates are produced based on the thus obtained seek-template data. A master seek template corresponds to one of the individual seek templates that is produced based on a corresponding batch of seek-template data such that the one individual seek template is not rotated by any angles. The other individual seek templates are obtained by rotating the master seek template by respective angles equal to respective products of a predetermined rotation pitch and respective integral numbers, within a predetermined angular range, as indicated at two-dot chain line in FIG. 17. The thus obtained individual seek templates are stored in the DRAM 256.

As shown in FIG. 14, data indicating the above-mentioned predetermined rotation pitch and angular range are stored with each batch of seek-template data in the DRAM 256. The term "pitchA=4.5" on Line 15 defines the predetermined rotation pitch (i.e., 4.5 degrees), the term "start=−45" on Line 16 defines a start angle of the predetermined angular range (i.e., −45 degrees), and the term "end=45" on Line 17 defines an end angle of the angular range (i.e., 45 degrees). Data indicating a rotation pitch and an angular range based on which individual seek templates are produced are prepared in advance for each sort of object 180. For example, in the case where it is expected that a certain sort of object 180 may be placed on the lower glass plate 54 of the object supporting device 58 with a great rotation-position error, a wide angular range is predetermined for that sort of object 180. In the example shown in FIG. 11, the preliminary processing program defines a predetermined seek-template-production angular range of −45 to +45 degrees and a predetermined rotation pitch of 5 degrees.

If the production of all individual seek templates for the first object 180 ends, the control in accordance with the control program shown in FIG. 11 returns to the start. Then, for the next, second object 180, it is judged whether a pattern matching is to be performed and, if a positive judgment is made, a plurality of individual seek templates are produced for the sort of object 180. On the other hand, if a negative judgment is made, the control returns to the start and, for the further, third object 180, it is judged whether a pattern matching is to be performed. If this judgment is done for all objects 180 to be measured or inspected and the production of individual seek templates ends for each of the objects 180 for which a positive judgment is made, the control quits the control program of FIG. 11.

Next, there will be described the control in accordance with an image processing program shown in FIG. 12. This program is carried out after an image of an object 180 is taken by the CCD camera 78 and a batch of image data representing the taken image is stored in an appropriate one of the four FGMs 264. First, if the image of object 180 is a simple one which can be image-processed by a single pattern matching only, for example, if the image of object 180 is square, the image is processed according to a pattern matching program shown in FIG. 13.

Next, it is judged whether the image of object 180 needs to be processed by a pattern matching manager wherein pattern matchings are combined. The pattern matching manager is described here because it is not relevant to the present invention. For example, a positive judgment is made at this step, if an object 180 is an EC having a number of lead wires and accordingly having a complicated shape, such as QFP (quad flat package), PLCC (plastic leaded chip carrier), or SOP (small out line package); one including a number of portions whose images are to be processed, such as BGA (ball grid array) including a number of solder bumps; one having a complicated shape whose image is to be processed, such as a grid pattern of a solar cell; or a part or component of a machine that has a complicated shape.

If a negative judgment is made at the above step, that is, if no operation of the pattern matching manager is needed, then it is judged at the next step whether the image of object 180 needs to be processed on a virtual screen. If a negative judgment is made, then it is judged whether the image of object 180 needs to be processed on a physical screen. The physical screen is defined as one on which a batch of image data actually exists which includes a number of sets of picture-element data each of which represents an optical characteristic value of a corresponding one of a number of picture elements of the physical image of the object 180. The virtual screen is defined as one on which a plurality of sets of virtual-point data assumedly exist which are obtained, as needed, by calculation based on the batch of image data and each set of which represents an optical characteristic value of a corresponding one of a plurality of virtual points designated independent of the picture elements of the physical image represented by the batch of image data. The pattern matching program of FIG. 13 and the pattern matching manager are carried out or operated on the virtual screen as will be described later. However, the image processing device 12 can perform an image processing operation on each of the virtual screen and the physical screen, without using the pattern matching program of FIG. 13 or the pattern matching manager. Judging whether the image of object 180 needs to be processed on the virtual screen, and whether the image of object 180 needs to be processed on the physical screen means judging whether the object inspecting program includes a command that the image of object 180 be processed by the pattern matching program of FIG. 13 or the pattern matching manager.

There will be described the pattern matching program of FIG. 13.

First, a search window is produced which defines or limits a seek area within which an object 180 to be image-processed is sought. The production of the search window is achieved by designating the coordinate values of each of a plurality of points defining a certain portion, or the entirety, of the imaging surface (i.e., the field of view) of the CCD camera 76. Of what sort the object 180 is known from the data included in the object inspecting program. Therefore, the image processing device 12 can approximately estimate a position of an image of the object 180 formed on the imaging surface of the CCD camera 76. Thus, the search window can be produced to fully encompass or cover the image of the object 180, even if the object may have more or less X-direction and/or Y-direction position errors and/or rotation-position error. In this way, the search window is moved in a narrow seek area, and accordingly only a short time is needed to seek out the object 180.

A complete pattern matching operation includes five steps, i.e., a seek step, a re-seek step, a measure step, a re-measure step, and an inspect step. The seek step is for seeking an object 180 to be image-processed; the re-seek step is for seeking edge points corresponding to an edge of the object 180; the measure step is for calculating the coordinate values of each of the edge points; and the re-measure step is for repeating the measure step one or more times. Usually the pattern matching ends when all the five steps end. However, if an abnormality occurs to any one of those steps, that one step is immediately terminated, and the following step is not started. That is, the pattern matching is immediately terminated.

First of all, the seek step will be described.

Figure 18:
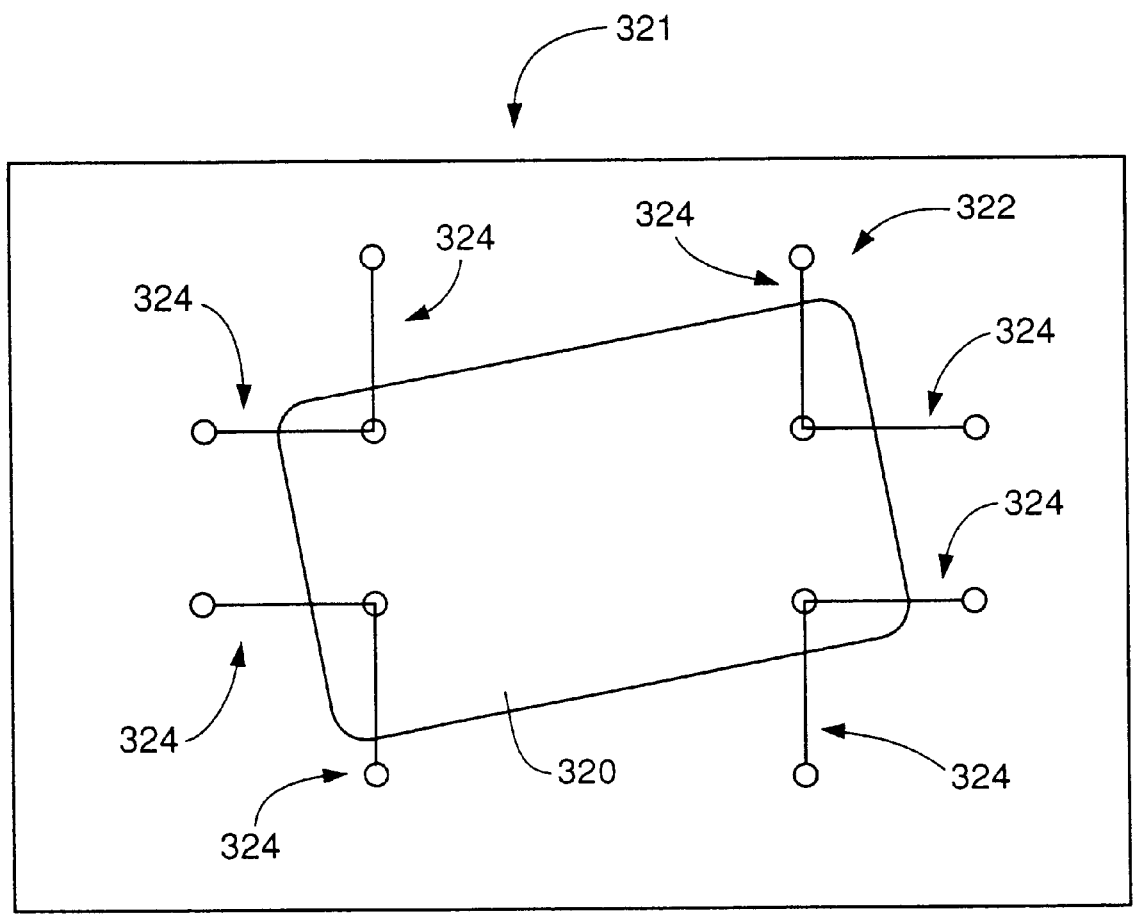
FIG. 18 is a view showing an individual seek template which is placed on a virtual screen in a seek step of the pattern matching program.

In the seek step, individual seek templates are sequentially read, one by one, from the DRAM 256. As shown in FIG. 18, each individual seek template 322 is placed, on a virtual screen 321, on a physical image which, in fact, is not present on the virtual screen 321 but is present on the physical screen, i.e., the imaging surface of the CCD camera 78 and which includes a taken image 180 of an object 180 to be processed and an image of the background of the object 180. The background image means the image other than the image of the object 180 to be processed. For example, in the case where the object 180 to be image-processed is a recess formed in an outer surface of a part or a component, the background image is the image of the outer surface other than the image of the recess. Then, the computer of the image processing device 12 calculates an optical characteristic value of the physical image that corresponds to each point of a plurality of pairs of points 324 defining the individual seek template 322. In the present embodiment, the optical characteristic value is a luminance value. Regarding the example shown in FIG. 14, an individual seek template which has a rotation angle of −45 degrees is first read from the DRAM 256.

More specifically described, the computer calculates, by interpolation, a luminance value corresponding to each of the points 324 on the virtual screen 321, based on the respective luminance values of the picture elements of the taken image 320 and the background image on the physical screen. FIG. 18 visualizes the points 324 which define the individual seek template 322, exist on the virtual screen 321, and correspond to the thus calculated luminance values, respectively. This means that a seek template is placed or superposed on a screen on which an image represented by a batch of image data is present. Thus, the respective luminance values corresponding to the template-defining points 324 are calculated based on the respective luminance values of the picture elements of the physical image that correspond to the defining points 324. Regarding the virtual screen 321 shown in FIG. 18, the taken image 320 or the batch of image data representing the image 320 is just assumed to exist on the virtual screen 321 and, in fact, does not exist. This also applies to the examples shown in the other figures.

Figure 19:
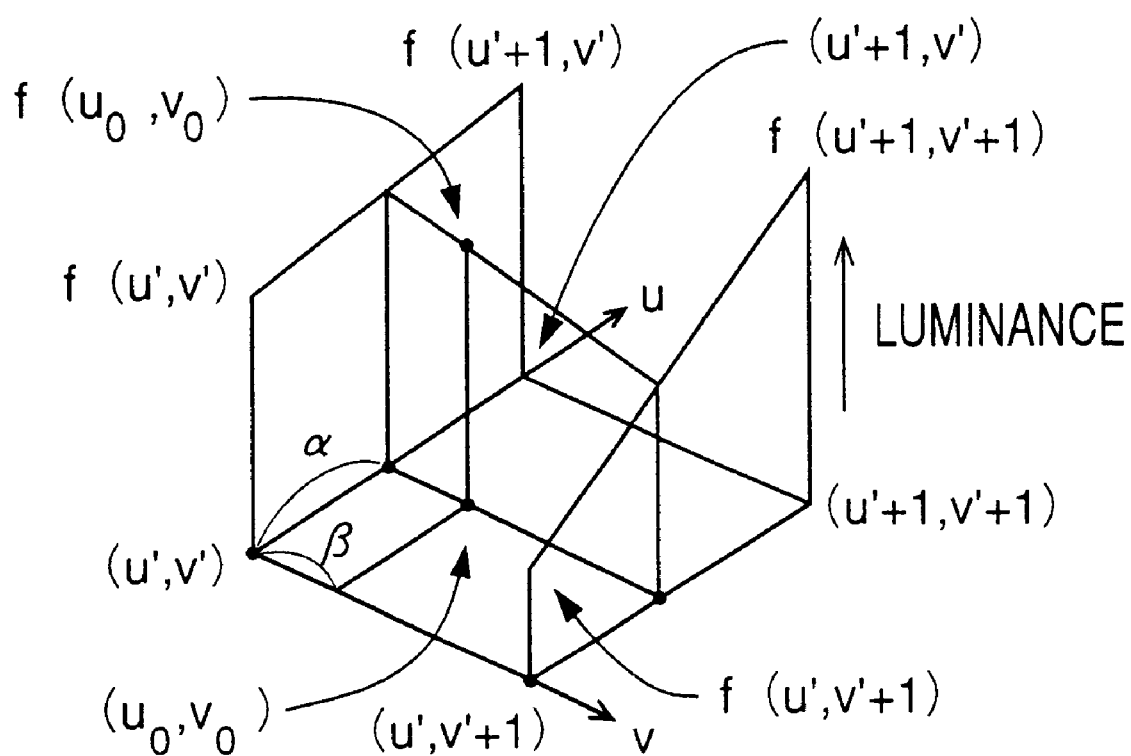
FIG. 19 is a view for explaining a manner in which a luminance value corresponding to a virtual point designated on the virtual screen is calculated by linear interpolation.

The interpolation of respective luminance values of the picture elements of the taken image 320 and the background image that correspond to each one of the template-defining points 324 may be carried out using a continuous curved surface, for example, a bicubic spline surface defined by 4×4 (=16) control points provided by 4×4 picture elements which correspond to the each one defining point 324. However, in the present embodiment, four picture elements of the physical image that are adjacent to each defining point 324 on the virtual screen 321 are used to calculate, by the simplest linear interpolation, a luminance value corresponding to the each defining point 324. In FIG. 19, ($u_0$, $v_0$) represents a position of a template-defining point 324; f(u₀, v₀) represents a luminance value of the defining point (u₀, v₀); (u', v'), (u'+1, v'), (u', v'+1), and (u'+1, v'+1) represent respective positions of respective centers of four picture elements adjacent to the defining point (u₀, v₀); and f(u', v'), f(u'+1, v'), f(u', v'+1), and f(u'+1, v'+1) represent respective luminance values of the four adjacent picture elements. The luminance value, f, of the defining point 324 is calculated according to the following expression (1):

$$f = (u_0, v_0) \\ = f(u', v')(1 - \alpha)(1 - \beta) + f(u' + 1, v')\alpha(1 - \beta) + \\ f(u', v' + 1)(1 - \alpha)\beta + f(u' + 1, v' + 1)\alpha\beta \quad (1)$$

Figure 20:
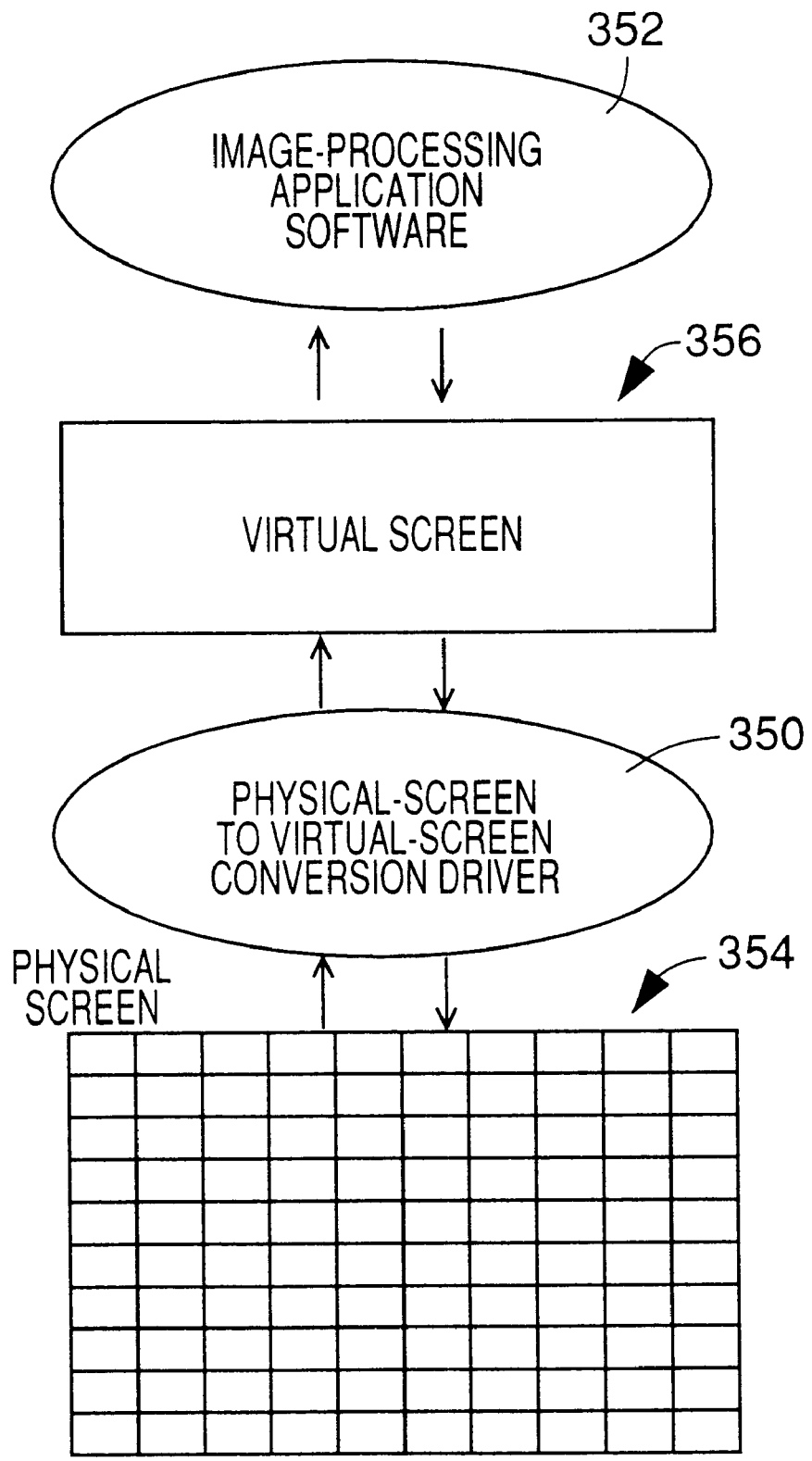
FIG. 20 is a schematic view of a physical-screen to virtual-screen conversion driver which is employed in the image processing device to convert image data representing a physical image on a physical screen, into image data representing a virtual image on the virtual screen.

The above-indicated calculation of luminance value f is carried out by a physical-screen to virtual-screen ("PS/VS") conversion driver 350 shown in FIG. 20. The PS/VS conversion driver 350 is independent of a common image-processing application software 352 employed in the image processing device 12. Each time the PS/VS conversion driver 350 is needed to produce image data defining a virtual point or points on a virtual screen 356, based on image data present on a physical screen 354, the computer uses the PS/VS conversion driver 350 to produce the image data defining the virtual point or points on the virtual screen 356.

Each time the respective luminance values corresponding to the two template-defining points 324 of each pair are calculated, those two luminance values are compared with each other. When the CCD camera 78 takes a silhouette image of an object 180 to be measured or inspected, there occurs a difference between the respective amounts of electric charges produced in a portion of the solid-state imaging elements of the CCD camera 78 that corresponds to the object 180 to be image-processed and the remaining portion of the imaging elements of the same 78 that corresponds to the background of the object. That is, the taken image of the object 180 to be image-processed is darker than the image of the background. Therefore, if the absolute value of difference of the respective luminance values corresponding to the two defining points 324 of each pair is not smaller than a reference luminance-difference value, it can be concluded that one of the two points 324 is located inside the edge of the image of the object 180 and the other point 324 is located outside the edge, i.e., in the background of the object 180.

Data indicating the above-mentioned reference luminance-difference value are pre-stored with the seek-template data in the memory card, and are stored in advance in the DRAM 256. In the example shown in FIG. 14, Line 5 defines a reference luminance-difference value, "diff=20". In the present embodiment, the difference of the respective luminance values corresponding to the two defining points 324 of each pair is obtained by subtracting the luminance value of a virtual point corresponding to one of the two points 324 that is estimated to be located inside the edge of the object, from that corresponding to the other point 324 which is estimated to be located outside the edge. If the thus obtained luminance difference is not smaller than 20 (degrees), it is judged that one point 324 which is estimated to be located inside the edge is actually located inside the edge and the other point 324 which is estimated to be located outside the edge is actually located outside the edge. In the present embodiment, each set of picture-element data can indicate one of natural numbers from 1 to 256 as a luminance value of a corresponding picture element.

However, it is possible to determine a luminance difference by subtracting the luminance value corresponding to one of the two defining points 324 that is estimated to be located outside the edge of the object, from that corresponding to the other defining point 324 that is estimated to be located inside the edge. In the latter case, Line 5 shown in FIG. 14 is modified to define a reference luminance-difference value, "diff=−20".

In either case, the pair of defining points 324 in question satisfies a predetermined condition that the absolute value of the luminance difference is not smaller than a reference luminance-difference value (hereinafter, referred to as the "luminance-difference condition"), and it is therefore concluded that one of the two points 324 is located inside the edge of the object and the other point 324 is located outside the edge.

However, one or more pairs of defining points 324 may fail to satisfy the above-defined luminance-difference condition, (a) because the object 180 being image-processed is not identical with the reference object corresponding to the master seek template and accordingly the two defining points 324 are not located on both sides of the edge of the object 180, (b) because no object 180 has been placed on the lower glass plate 54 of the object supporting device 58 due to an object-supply failure, or (c) because some solid-state imaging elements (i.e., some CCDs 82) of the CCD camera 78 fail to take respective picture-element images due to, e.g., dust adhered thereto. Hereinafter, this will be referred to as the "point-pair failure or failures". If the computer finds greater than a predetermined number of permissible point-pair failures (e.g., one, two, etc.), the computer judges that the object 180 being image-processed is not identical with the reference object corresponding to the master seek template represented by the seek-template data stored in the DRAM 256. For example, in the example shown in FIG. 14, Line 3 defines a predetermined number of permissible point-pair failures, "failCount=0". Therefore, if at least one pair of points 324 fails to satisfy the luminance-difference condition, it is not judged that the object 180 being image-processed is identical with the reference object corresponding to the master seek template.

In the case where the predetermined number of permissible point-pair failures (i.e., "failCount") is one or a greater number, the computer judges, if greater than the predetermined number of pairs of points fail to satisfy the luminance-difference condition, that the object 180 being image-processed is not identical with the reference object corresponding to the master seek template. If the computer makes a positive judgment that the object 180 being image-processed is identical with the reference object, as a result of use of the first individual seek template having the rotation angle of −45 degree, the seek step is terminated, and the re-seek step is commenced. On the other hand, if a negative judgment is made, another individual seek template having a different rotation position is read from the DRAM 256 to seek the object 180 in question.

So long as negative judgments are made, individual seek templates having respective rotation positions are sequentially read from the DRAM 256 to seek the object 180 in question. Unless a positive judgment is obtained even after all the individual seek templates are used, then the seek step is continued by changing the current position of the individual seek templates to a new one. More specifically described, the individual seek templates are moved in the X and/or Y directions at respective pitches to a new position where the individual seek templates are used to seek out the actual object 180 identical with the reference object.

Data indicating the above-mentioned X-direction and Y-direction movement pitches are prepared in advance and pre-stored with the seek-template data in the memory card. Regarding the example of FIG. 14, Lines 13 and 14 define predetermined X-direction and Y-direction movement pitches, "pitchX=2.2" and "pitchY=2.2", respectively. First, the individual seek templates are moved to a new position in the Y direction by the predetermined Y-direction movement pitch, "pitchY=2.2". More specifically described, the coordinate values of each of all the template-defining points 324 are moved by the predetermined pitch in a positive direction of the Y direction. At the new position, the individual seek templates 322 are used to judge whether the object 180 being image-processed is identical with the reference object. Unless a positive judgment is made even if all the individual seek templates 322 having the different rotation positions are moved to the new position and applied to the taken image 320 on the virtual screen 321, then the individual seek templates 322 are moved to another new position in a positive direction of the X direction by the X-direction pitch, "pitchX=2.2". Unless a positive judgment is made at this new position, then the individual seek templates 322 are moved in a negative direction of the Y direction by the Y-direction pitch. Unless a positive judgment is made at this new position, then the individual seek templates 322 are moved once more in the negative direction of the Y direction by the Y-direction pitch. Unless a positive judgment is made at this new position, then the individual seek templates 322 are moved in a negative direction of the X direction by the X-direction pitch. In this way, the individual seek templates 322 are moved in the search window while drawing a "rectangular" spiral locus of movement.

If no positive judgment has been made and one or more pairs of points 324 have gone out of the search window as a result of the spiral movement of the individual seek templates 322, the CPU 254 judges that the individual seek templates 322 can no longer be moved in the search window and makes a final conclusion that the object 180 being image-processed is not identical with the reference object, that is, that there is no actual object 180 possibly identical with the reference object, in the search window. Thus, the CPU 254 recognizes an abnormality, terminates the seek step, operates the buzzer, commands the monitor device 14 to display that the abnormality has occurred, and stores data indicating the occurrence of the abnormality in the DRAM 256. In response thereto, the operator checks the position where the object 180 is placed on the glass plate 54 of the object supporting device 58 and, if the operator recognizes that the object 180 has been placed largely out of position, he or she corrects the position. On the other hand, if the object 180 has been placed in position, the operator can conclude that the object 180 is not an expected one, e.g., not one which is prescribed by the object inspecting program. In the last case, the operator can discard the object 180.

Figure 21:
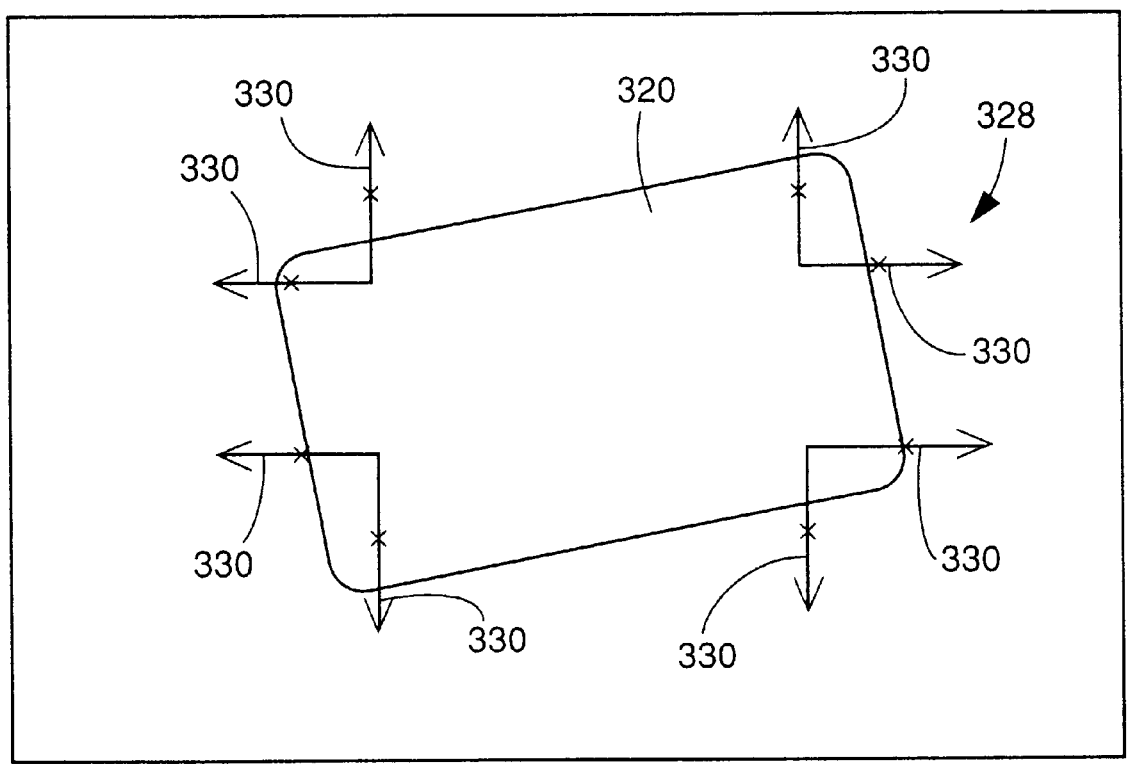
FIG. 21 is a view showing a re-seek template which is placed on the virtual screen in a re-seek step of the pattern matching program.

Regarding the taken image 320 shown in FIG. 18, all the pairs of points 324 of the individual seek template 322 satisfies the luminance-difference condition, and the two points 324 of each pair are located inside and outside the edge of the image 320, respectively. In this case, a positive judgment is made that the object 180 whose image 320 is being processed is identical with the reference object corresponding to the master seek template, and data indicating the X-direction and Y-direction positions and rotation position of the individual seek template 322 are stored in the DRAM 256. Then, the seek step is followed by the re-seek step in which a re-seek template 328 is used to seek edge points of the taken image 320, as shown in FIG. 21. The re-seek template 328 includes a plurality of search lines 330 which are produced based on the individual seek template 322 with which the object 180 whose image 320 is being processed is judged, in the seek step, as being identical with the reference object, on a re-seek-template coordinate plane, i.e., the coordinate plane of that individual seek template 322. Each search line 330 is defined as a straight segment connecting between the two points 324 of a corresponding pair. Thus, the search lines 330 of the re-seek template 328 exist on the virtual screen 321.

Figure 22:
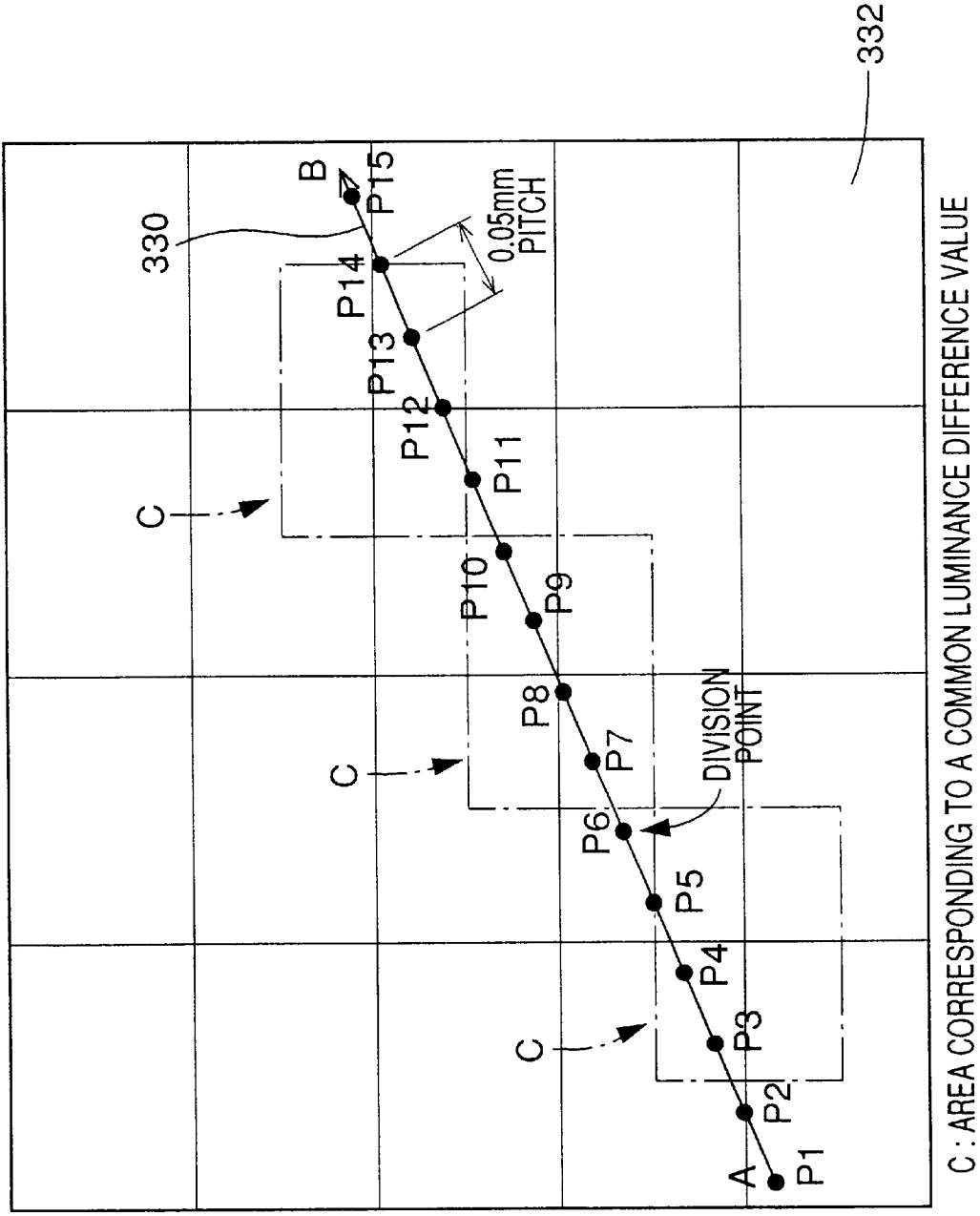
FIG. 22 is a view showing a relationship between division points determined on a search line of the re-seek template, and solid-state imaging elements defining an imaging surface of the CCD camera of the image taking device.

Each of the search lines 330 is used to seek an edge point where the each search line 330 intersects the edge of the taken image 320. In this sense, the re-seek template 328 can be deemed as a sort of measure template which will be described in detail later. As shown in FIG. 22, each search line 330 is divided at a predetermined dividing pitch (e.g., 0.05 mm) to provide a plurality of division points, $P_1$ to $P_{15}$. The CPU 254 calculates, by linear interpolation, a luminance value corresponding to each division point $P_1$–$P_{15}$, in the same manner as that employed in the seek step. The above-indicated search-line dividing pitch is predetermined at a length shorter than the length of diagonal lines of each solid-state imaging element 332 (i.e., each CCD 82) of the CCD camera 78. For example, three or four division points P are provided corresponding to each imaging element 332. The thus obtained division points P ($P_1$–$P_{15}$) are virtual points present on the virtual screen 321.

FIG. 23 shows a table which contains the respective luminance values of the fifteen division points $P_1$–$P_{15}$ obtained by the linear interpolation. Those luminance values are expressed in terms of such positive values which increase as the lightness of the taken image 320 increases. In the present embodiment, the image taking device 10 emits parallel light rays toward the back surface of an object 180 to be measured or inspected, and takes an image of the object 180 based on the parallel rays which have passed around the object 180. The following description is made on the assumption that an object 180 being image-processed is darker than the background thereof and that picture elements of a taken image of the object 180 have smaller luminance values than those of picture elements of a taken image of the background.

Figure 26:
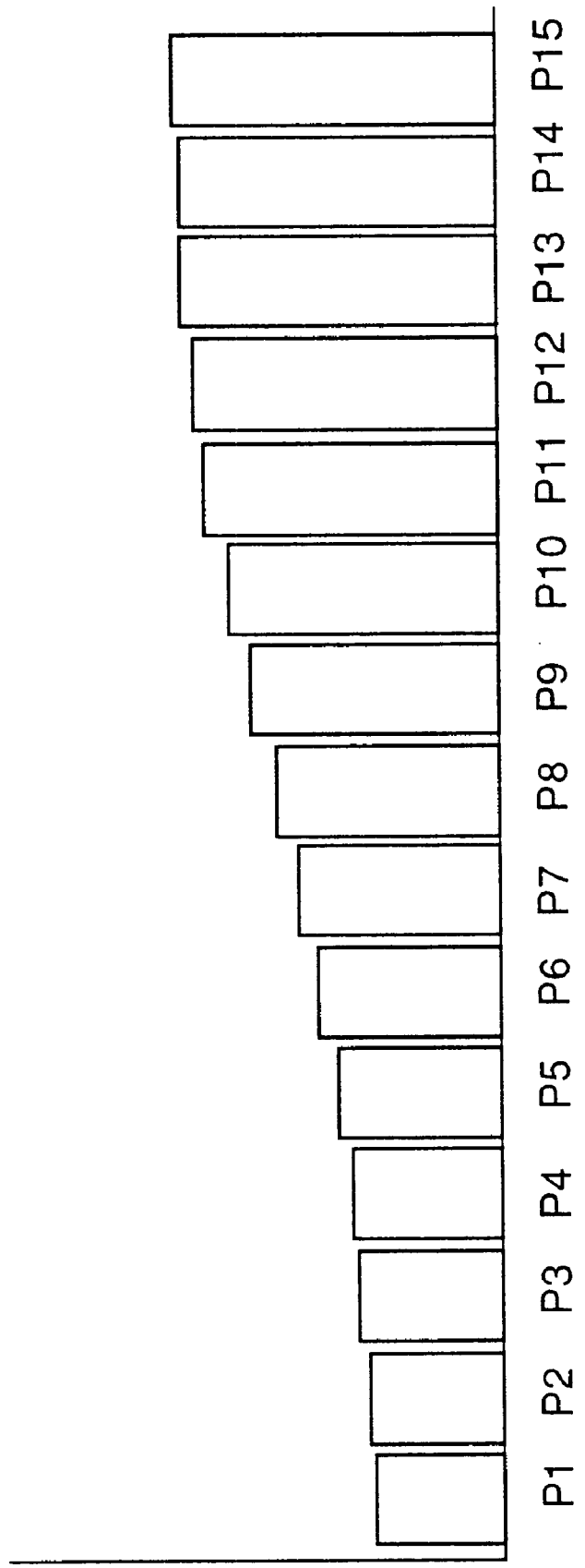
FIG. 26 is a graph showing the calculated luminance values shown in FIG. 23.
Figure 27:
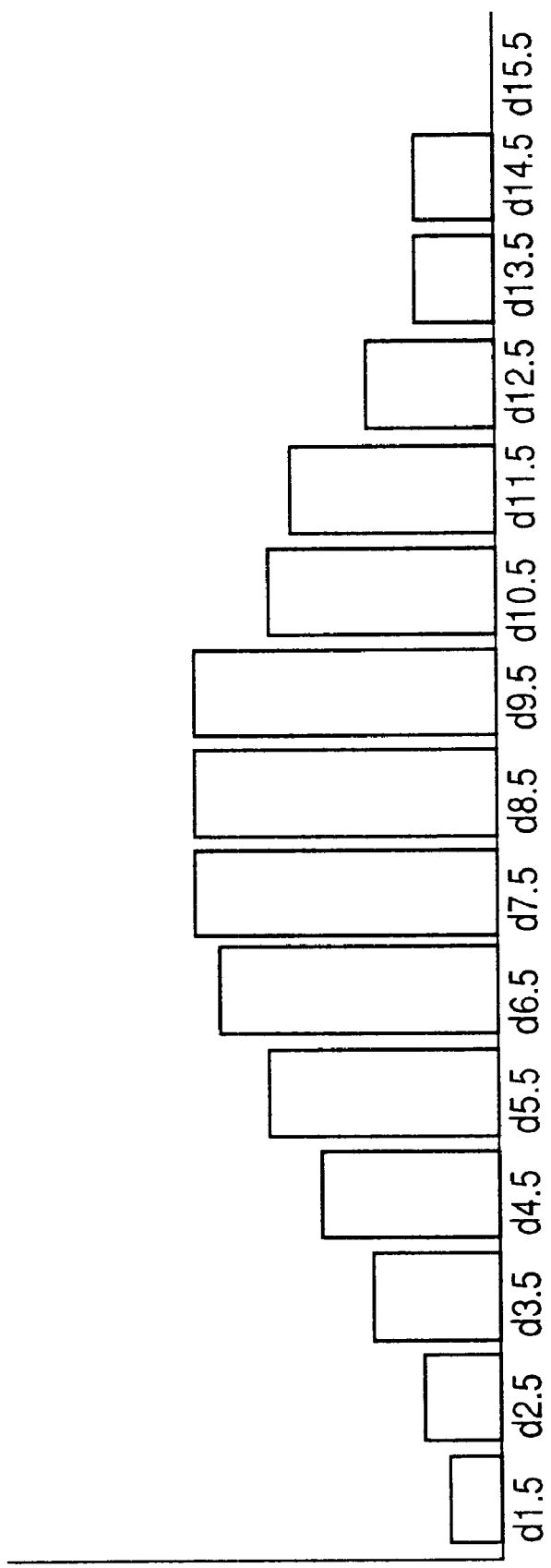
FIG. 27 is a graph showing differential values obtained by using the differential filter of FIG. 24.

FIG. 26 shows a bar graph representing the respective luminance values of the division points $P_1$–$P_{15}$ shown in FIG. 23. However, the position where the luminance values of the division points $P_1$–$P_{15}$ most greatly change is not readily apparent from the bar graph of FIG. 26. Hence, a finite-difference filter is used to obtain differential values from the luminance values of the division points $P_1$–$P_{15}$ and determine an edge point on each search line 330 that corresponds to the greatest one of the thus obtained differential values. FIG. 27 shows differential values obtained by applying a finite-difference filter, shown in FIG. 24, to the luminance values of the division points $P_1$–$P_{15}$ shown in FIG. 23. The finite-difference filter of FIG. 24 is used, in a direction from one, A, of two opposite end points, A and B, of the search line 330 (FIG. 22) toward the other end point B to subtract a luminance value of each point $P_1$–$P_{14}$ from that of its adjacent point $P_2$–$P_{15}$. As shown in FIG. 27, each of the thus obtained differential values is associated with the middle point (indicated by "0.5" of d1.5 to d15.5 shown in FIG. 27) of a corresponding pair of adjacent points P. However, from the differential values shown in FIG. 27, the position is not yet apparent where the luminance values of the division points $P_1$–$P_{15}$ most greatly change.

The positive (+) or negative (−) signs of the differential values obtained from the luminance values of the division points $P_1$–$P_{15}$ are inverted depending upon the direction in which the finite-difference filter is applied to those luminance values. In the case where the filter is applied in the direction from inside the edge of the taken image 320 toward outside the edge, the obtained differential values have the positive sign (+). On the other hand, in the case where the filter is applied in the opposite direction from outside the edge of the image 320 toward inside the edge, the obtained differential values have the negative sign (−). In the former case, the greatest one of respective absolute values of the differential values (i.e., the rates of change) corresponds to the greatest one of the differential values and, in the latter case, the greatest one of respective absolute values of the differential values corresponds to the smallest one of the differential values. Hereinafter, the greatest differential value obtained in the former case will be referred to as the "maximum differential value", and the smallest differential value obtained in the latter case will be referred to as the "minimum differential value". Each of FIGS. 26 and 27 shows the differential values obtained in the manner employed in the former case.

Figure 28:
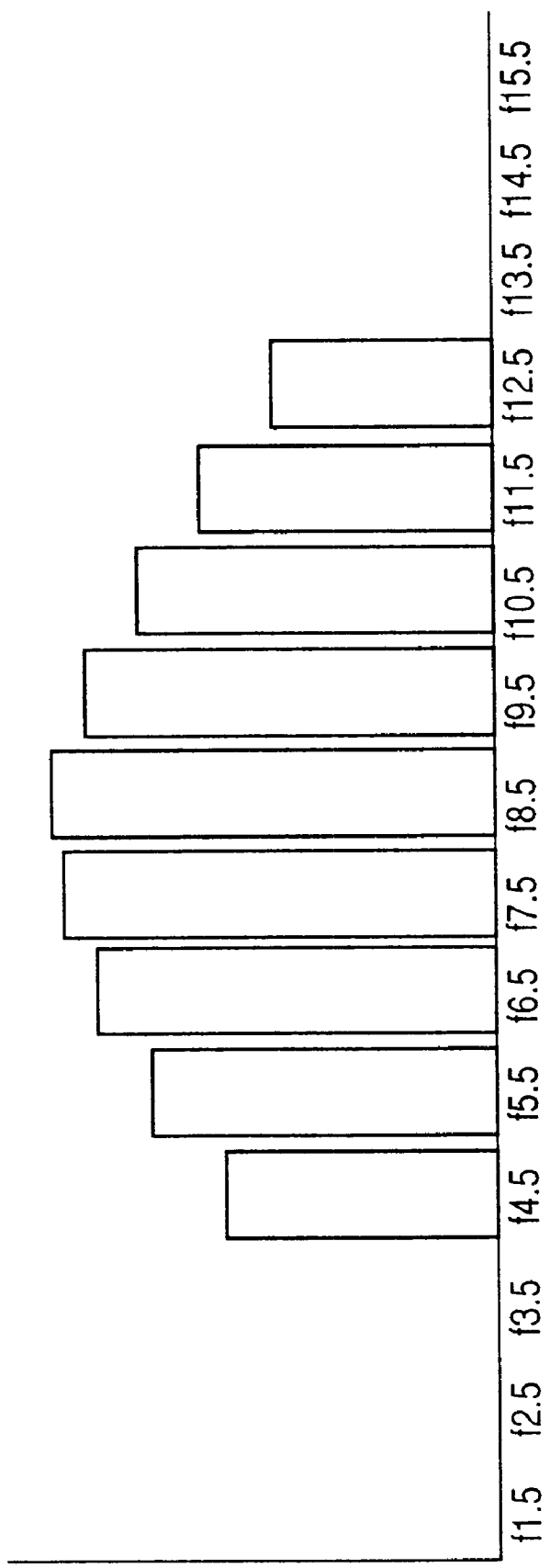
FIG. 28 is a graph showing differential values obtained by using the differential filter of FIG. 25.
Figure 35:
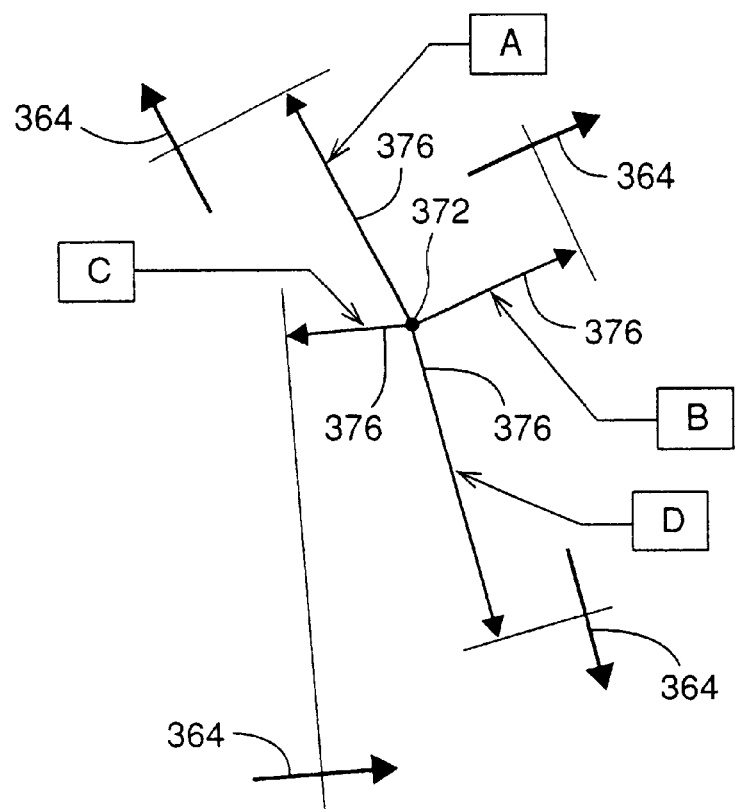
FIG. 35 is a view of the dimension center determined on the image of FIG. 30.

FIG. 28 shows differential values obtained by applying another finite-difference filter shown in FIG. 35, to the luminance values of the division points $P_1$–$P_{15}$ shown in FIG. 23, in the same direction as that in which the filter of FIG. 24 is applied. From the differential values of FIG. 28, it is apparent that the luminance values of the division points $P_1$–$P_{15}$ have the maximum differential value of 177 at the position of f8.5 on the search line 330. Thus, the CPU 254 concludes that the luminance values of the taken image 320 and the background image most significantly change at the position of f8.5 on the search line 330. The finite-difference filter of FIG. 25 is used to subtract the sum of the respective luminance values of each group of four successive division points out of the division points $P_1$–$P_{12}$, from the sum of the respective luminance values of its adjacent group of four successive division points out of the division points $P_5$–$P_{15}$.

If dust or the like adheres to a portion of the solid-state imaging elements 332 of the CCD camera 78 that corresponds to the edge of the taken image 320, and adversely influences the amounts of electric charges produced in that portion of the CCD camera 78, a maximum (or minimum) differential value may be determined at a position different from that of an edge point. However, the absolute value of that maximum (or minimum) differential value is considerably small. In contrast, the absolute value of a maximum (or minimum) differential value obtained with a sufficient proximity to an edge point is considerably great because of a significantly great difference between respective lightness of the object image 320 and the background image. Hence, a threshold or reference value may be employed to judge whether the absolute value of an obtained maximum (or minimum) differential value is greater than the reference value and, if a negative judgment is made, discard that maximum (or minimum) differential value. More specifically described, in the above-described former or first case, a positive reference value is employed to judge whether a maximum differential value is greater than the positive reference value and, if a positive judgment is made, adopt the maximum differential value as a value properly corresponding to an edge point of the object image 320. Thus, the maximum differential value is used to determine the position of the edge point in a manner described later. In the above-described latter or second case, a negative reference value is employed to judge whether a minimum differential value is smaller than the negative reference value and, if a positive judgment is made, adopt the minimum differential value as a value properly corresponding to an edge point of the object image 320. Similarly, the minimum differential value is used to determine the position of the edge point. On the other hand, if a negative judgment is made in the first or second case, the CPU 254 concludes that the maximum (or minimum) differential value does not correspond to an edge point, and counts it as a failure of the search line 330 in the re-seek step.

Regarding the example shown in FIG. 14, a finite-difference filter is used to obtain differential values in a direction from inside an edge of a taken image toward outside the edge. This direction is the same as that in which an finite-difference filter is used to obtain the differential values shown in FIG. 26 or 27. Thus, a maximum differential value of all the differential values obtained from the example of FIG. 14 is compared with a positive reference value, "ll=200", defined by Line 5 of FIG. 14. If the maximum differential value is not greater than the reference value, the CPU 254 concludes that the maximum differential value does not correspond to an edge point of the object image 320. Thus, no edge point is determined on the search line 330.

Respective edge points are determined on the search lines 330 by using a prescribed sort of finite-difference filter. A number, N, designating a finite-difference filter of a sort suitable for the predetermined dividing pitch at which the search line 330 is divided into the division points $P_1$–$P_{15}$, is determined according to the following expression (2):

$$N = g\text{Unit}/(\text{dividing pitch}) \qquad (2)$$

where gunit is the length of diagonal lines of the imaging elements 332 of the CCD camera 78.

The filter shown in FIG. 24 has the number N=2, and the filter shown in FIG. 25 has the number N=4.

The position of each edge point is specified according to the following expressions (3), (4), (5), and (6), in the case where the number N is four (N=4) and accordingly the filter of FIG. 25 is used:

$$dl = f_{max} \times 4 - (f_{(max-1)} + f_{(max-2)} + f_{(max-3)} + f_{(max-4)}) \qquad (3)$$

$$dr = f_{max} \times 4 - (f_{(max+1)} + f_{(max+2)} + f_{(max+3)} + f_{(max+4)}) \qquad (4)$$

$$\text{edgePitch} = (dl \times N)/(dl + dr) - N/2 \qquad (5)$$

(edge-point position)=(number of pitches from position of start division point to position of point corresponding to maximum (or minimum) differential value+edgePitch)×(dividing pitch) (6)

In the above expressions (3), (4), the terms, $f_{(max \pm n)}$, indicate differential values obtained from luminance values by using the N=4 filter. In particular, the term, $f_{max}$, means the maximum (or minimum) differential value. The symbol "f" of the terms, $f_{(max \pm n)}$, indicates a differential value corresponding to a position designated by the number, max±n. Regarding the example of FIG. 28, $f_{max}$ is the maximum differential value obtained at position f8.5; $f_{(max-1)}$, $f_{(max-2)}$, $f_{(max-3)}$, and $f_{(max-4)}$ are differential values obtained at positions f7.5, f6.5, f5.5, and f4.5, respectively; and $f_{(max+1)}$, $f_{(max+2)}$, $f_{(max+3)}$, $f_{(max+4)}$ are differential values obtained at positions f9.5, f10.5, f11.5, and f12.5, respectively.

The above-indicated expressions (3), (4) used for the case where the N=4 filter is used are generalized such that the value "dl" is obtained by subtracting, from the product of the maximum (or minimum) differential value and the number N, the sum of the same number (N) of differential values located upstream of the maximum (or minimum) differential value in the direction in which the filter is used and such that the value "dr" is obtained by subtracting, from the same product, the sum of the same number (N) of differential values located downstream of the maximum (or minimum) differential value in the same direction. In the particular case where the filter of FIG. 25 is applied to the luminance values of FIG. 23, the number of pitches from the position of start division point A to the position of the point corresponding to the maximum differential value, occurring in the expression (6), is 8.5 (i.e., f8.5 shown in FIG. 28).

In short, the position of each edge point is determined by, first, calculating respective luminance values of the division points $P_1$–$P_{15}$ by linear interpolation, subsequently approximately differentiating those luminance values by using a finite-difference filter having a number N, then performing the calculations according to the expressions (3) to (6), and finally determining a point corresponding to the maximum (or minimum) differential value as an edge point at which the luminance values most greatly change on a search line. Regarding the search line 330 shown in FIG. 22, the expression (6) provides 0.403 mm as the position of the edge point, which means that the edge point is distant by 0.403 mm from the start division point A ($P_1$).

In this way, the position of an edge point is determined on each of the search lines 330 shown in FIG. 21. If the number of failures of the search lines 330 is not greater than a reference number, the CPU 254 judges that the re-seek step has ended normally, and proceeds with the following, measure step. On the other hand, if the failure number is greater than the reference number, the CPU 254 recognizes an abnormality and operates in the same manner as described above in relation with the seek step. However, in the case where the CPU 254 is programmed to recognize an object 180 being image-processed as being identical with a reference object when the number of failures of the pairs of points 302 of the individual seek template 300 is not greater than a reference number, the CPU 154 recognizes an abnormality based on the sum of the number of the point-pair failures and the number of the search-line failures. In the example of FIG. 14, Line 3 defines a reference number, "failCount=0". In this case, therefore, when even a single search-line failure is recognized, the re-seek step is immediately ended abnormally.

If the re-seek step ends normally, then the control of the CPU 254 proceeds with the measure step. As described above, a re-seek template is produced based on an individual seek template with which an object 180 being image-processed has been recognized as being identical with a reference object in the seek step. Accordingly, in the re-seek step, an edge point can be found on each search line 330. However, usually there occurs some position deviation between the edge point and the middle point of the each search line 330. Hereinafter, the middle point of each search line 330 will be referred to as the "reference edge point" thereof, and the edge point found on the each search line 330 will be referred to as the "actual edge point" thereof. In FIG. 21, each reference edge point is indicated at symbol, "x". If the object 180 being image-processed has no dimension, X-direction or Y-direction position, or rotation-position deviations, all the actual edge points should coincide with the corresponding reference edge points. In fact, however, the object 180 being image-processed may have some dimension, X-direction and Y-direction position, and/or rotation-position errors and accordingly the determined actual edge points may not coincide with the corresponding reference edge points on the search lines 330.

Figure 29:
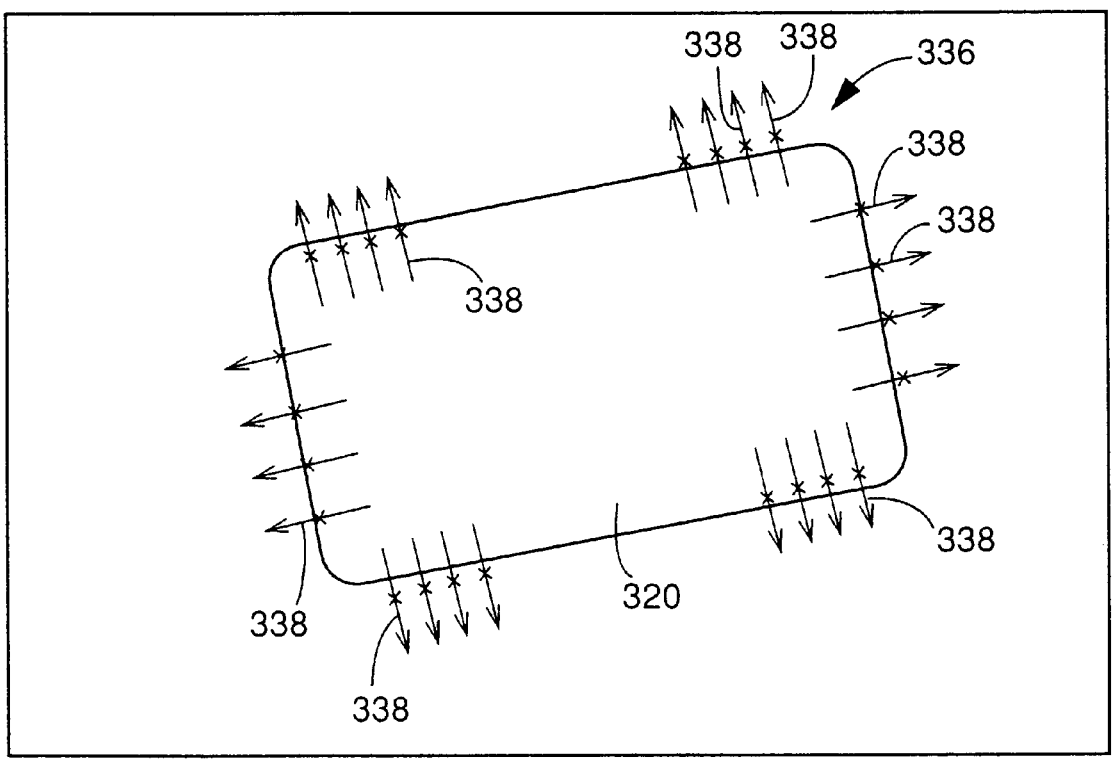
FIG. 29 is a view showing an individual measure template which is placed on the virtual screen in a measure step of the pattern matching program.

When the re-seek step ends normally and the control of the CPU 254 proceeds with the measure step, the position of each edge point is determined in the measure step. First, the CPU 254 automatically produces a measure template 336 as shown in FIG. 29. The measure template 336 includes a plurality of measuring search lines 338, and is produced based on a pre-stored batch of measure template data, data indicating the X-direction and Y-direction positions and rotation position of the re-seek-template coordinate plane used in the re-seek step, relative to the reference coordinate plane of the CCD camera 78, and the respective positions of the actual edge points determined on the re-seek-template coordinate plane.

Figure 16:
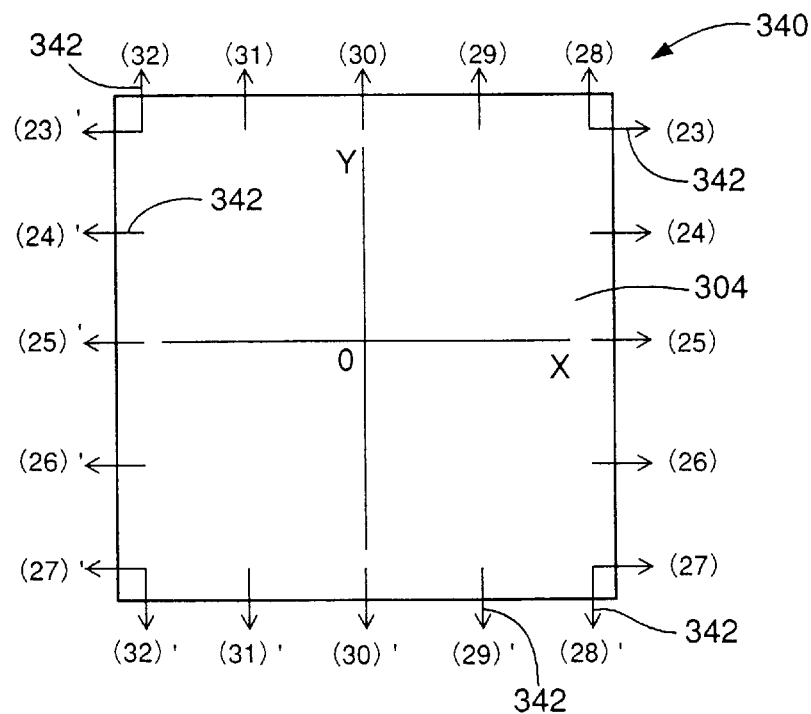
FIG. 16 is a view showing a master measure template defined by the pre-stored data shown in FIG. 14, together with the square image.

FIG. 14 shows an example of measure-template data which is stored with the seek-template data. Lines 20 to 33 of FIG. 14 define various data needed to perform the measure step. More specifically described, "hs=3.5" of Line 21, Lines 23–27, and Lines 29–33 define the measure-template data. FIG. 16 shows a master measure template 340 represented by the measure-template data shown in FIG. 14. Reference numeral 342 designates measuring search lines of the master measure template 340. In the present embodiment, a master measure template 340 used for a particular sort of object 180 includes a greater number of search lines than the number of the pairs of points 302 of the master seek template 300 used for the same sort of object 180.

Some or all of the measuring search lines of each master measure template are paired. The two measuring search lines of each pair are symmetrical with each other with respect to an appropriate one of the X axis, Y axis, and origin of the reference coordinate plane. Hereinafter, the two measuring search lines of each pair is referred to as the "set of paired lines", if appropriate.

An individual measure template is produced by coordinate transformation of a master measure template which is represented by a batch of measure template data on a master-measure-template coordinate plane which coincides with the reference coordinate plane of the CCD camera 78. This coordinate transformation is so carried out as to compensate for the X-direction and Y-direction positions and rotation position of the re-seek-template coordinate plane (i.e., the coordinate plane of the individual seek template with which the object 180 being image-processed has been recognized as being identical with the reference object in the seek step) relative to the reference coordinate plane, and the X-direction and Y-direction positions and rotation position of the object 180 being image-processed relative to the re-seek-template coordinate plane (those are calculated, in a manner described later, based on the coordinate values of each of the edge points determined in the re-seek step).

After the automatic production of the individual measure template has ended, the determination of an edge point on each of the measuring search lines of the individual measure template is carried out in the same manner as that used in the re-seek step. In short, each measuring search line is divided at a predetermined dividing pitch to determine division points, and a luminance value corresponding to each of the division points is calculated by linear interpolation from the respective luminance values of the four picture elements of the taken image 320 that correspond to each division point. Subsequently, a finite-difference filter is used to calculate differential values from the respective luminance values of the division points, and an edge point is determined on each measuring search line based on the thus obtained differential values. An appropriate number of permissible search-line failures is predetermined for the measure step as well. A failure of a measuring search line is recognized when no edge point can be determined on that search line, similar to a failure of a search line recognized in the re-seek step. If the CPU 254 finds only not greater than the predetermined number of permissible search-line failures, the measure step ends normally, and the control of the CPU 254 proceeds with the following, re-measure step. On the other hand, if the CPU 254 finds greater than the predetermined number of permissible search-line failures, the CPU 254 recognizes an abnormality, and operates for dealing with the abnormality in the same manner as that employed in the seek step.

In the re-measure step, a re-measure template is produced and edge points are determined again. The re-measure template is automatically produced based on the individual measure template and the edge points that have been used and determined in the measure step. More specifically described, based on the edge points obtained in the measure step, the individual measure template is moved and/or rotated by coordinate transformation into such a re-measure template which is expected such that respective reference edge points of measuring search lines of the re-measure template will coincide with corresponding actual edge points, respectively. However, in fact, even with the re-measure template, some or all of the reference edge points may not coincide with corresponding actual edge points to be obtained in the re-measure step. In the re-measure step, too, edge points are determined on the measuring search lines of the re-measure template in the same manner as that used in the re-seek step.

The same predetermined number of permissible search-line failures as used in the measure step is used in judging whether an abnormality has occurred in the re-measure step. If the CPU 254 finds greater than the predetermined number of permissible search-line failures because no edge points can be determined on those search lines, the CPU 254 recognizes an abnormality, immediately terminates the re-measure step, and operates for dealing with the abnormality in the same manner as that used in the seek step. On the other hand, if the CPU 254 finds only not greater than the predetermined number of search-line failures, the CPU 254 ends the re-measure step normally, and subsequently calculates object vectors, that is, determines dimensions, X-direction and Y-direction positions, and rotation position of the object 180 being image-processed. The more times the re-measure step is repeated, the less the errors between the reference edge points and the actual edge points become. Thus, the accuracy of determination of the actual edge points increases. Data indicating the number of repetitions of the re-measure step is produced in advance and pre-stored in the memory card.

The re-measure step is repeated while a new re-measure template is automatically produced based on the preceding re-measure template and the actual edge points determined using the preceding one.

When the re-measure step ends normally, the computer compares the measured dimension-difference relating amount of the object 180, with a permissible range. If the measured mount falls within the permissible range, the computer judges that the object 180 has an appropriate or accurate dimension and passes the dimension inspection. However, if not, the computer judges that the object does not pass the inspection. Data indicating the reference range are prepared in advance for each sort of object 180 to be image-processed, and are pre-stored in the memory card. When the memory card is read by the image processing device 12, those data are stored in the DRAM 256, so that those data can be used in the dimension inspection.

Figure 30:
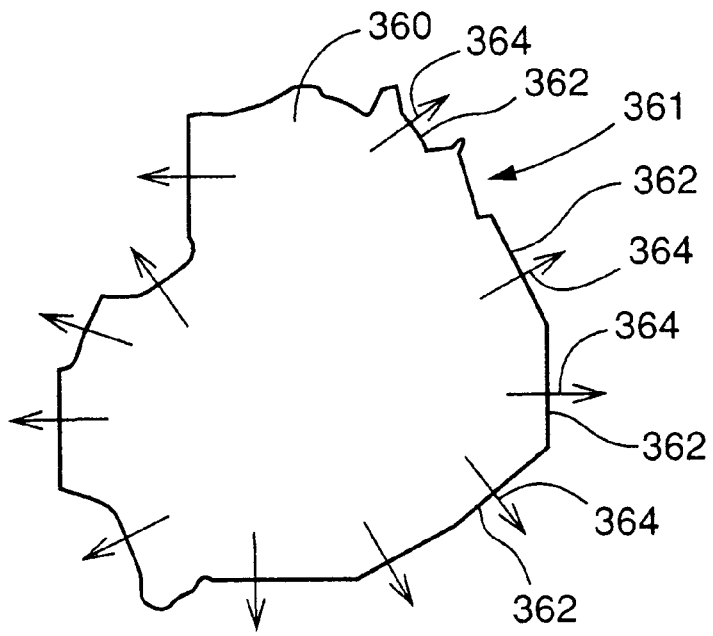
FIG. 30 is a view of another image which can be processed by the image processing device of FIG. 10.

While the foregoing description relates to the simple, square or quadrangular image 304, 320 of the object 180, for easier understanding purposes only, the present optical measuring apparatus can carry out a measurement on an object 180 having an image 360 whose edge 361 has a complex shape as shown in FIG. 30. The edge 361 includes a plurality of straight portions 362, and at least one search line 364 is pre-set for each of the straight portions 362 such that the search line 364 perpendicularly intersects the each straight portion 362 and has a predetermined direction from inside of the edge 361 toward outside of the same 361, and such that the search line 364 is not separated from the each straight portion 362 even if the image 360 is deviated by small distances from reference X-direction and Y-direction positions in the X and Y directions and/or is rotated by a small angle from a reference rotation position. The search lines 364 may not be parallel to the X or Y axis of the re-seek-template coordinate system or the master-measure-template coordinate system, or may not be paired as shown in FIG. 15 or FIG. 16.

Hereinafter, there will be described the operation of the image processing device 12 for calculating a dimension-difference rate, a positional deviation, and a rotation angle (i.e., an angular deviation) of the complex image 360 as just an example. The calculations which will be described below are performed according to a calculation performing program which is pre-stored in the memory card and is copied into the DRAM 256 when the memory card is set in the card reader of the image processing device 12.

A dimension-difference rate, a positional deviation, and/or a rotation angle of an object or its image are/is calculated depending on a command or commands. For example, regarding the example shown in FIG. 14, symbols, "P" and "A", of the data, "vf=PA", on each of Lines 5 and 21 indicate a positional deviation and a rotation angle, respectively, and command the calculations of a positional deviation and a rotation angle of an object 180 being image-processed.

The calculation of dimension-difference rate may be necessary or effective in each of the following situations: (1) that a dimension of an object 180 being image-processed should be determined for some reason; (2) that an object 180 should be distinguished from an object which is similar to a reference object but is not identical with the same; and (3) that, in the case where objects 180 have relatively great dimension differences, the number of occurrences of failure should be minimized in the re-seek step or the measure step. An example of the second situation (2) is that objects 180 having similar shapes but having more or less different dimensions should be identified from each other. In the third situation (3), the reason why the measurement of dimension of each object 180 is needed is as follows: If objects 180 have great dimension differences relative to the lengths of search lines, one or more failures are likely to occur. However, if a dimension measurement is performed at the beginning of at least one of the re-seek step, the measure step, and the re-measure step and the one step is carried out while the thus measured actual dimension is used as a reference dimension in at least the one step, the possibility of occurrence of failure can be reduced.

It is possible to calculate a dimension-difference rate in the above-indicated first and second situations (1), (2) only. However, here, it is assumed that a dimension-difference rate is calculated in the above-indicated third situation (3), and is obtained at the beginning of each of the re-seek step and the measure step.

First, the calculation of dimension-difference rate will be described.

Data representing the plurality of search lines 364 pre-set for the straight portions 362 of the edge 361 of the complex image 360 are prepared in advanced and are stored in the memory card (and then stored in the DRAM 256). A dimension-difference rate as a sort of dimension-difference relating amount of the image 360 or the object 180 is determined based on the sum of a plurality of products each of which is obtained by multiplying a corresponding one of respective edge-point deviations 370 (FIG. 31) of respective actual edge points 366 where the search lines 364 perpendicularly intersect the straight portions 362 of the edge 361, respectively, from respective reference edge points 368 pre-determined on the search lines 364, in respective directions parallel to the search lines 364, by a corresponding one of respective parallel-direction distances 376 of the reference edge points 368 from a dimension center 372 of the image 361 of the object 180 in the respective directions parallel to the search lines 364. Each of the edge-point deviations 370 can be said as a deviation vector parallel to the direction of the corresponding one of the search lines 364, and has a plus sign when having the same direction as that of the one search line 364 and a minus sign when having the opposite direction to that of the same 364. Each of the parallel-direction distances 376 can be said as a parallel vector parallel to the direction of the corresponding one of the search lines 364, and has a plus sign when having the same direction as that of the one search line 364 and a minus sign when having the opposite direction to that of the same 364. Each parallel vector 376 starts at the dimension center 372 and ends on a straight line 374 which perpendicularly intersect the corresponding search line 364 at its reference edge point 368. The dimension-difference rate will be described in detail later.

Figure 32:
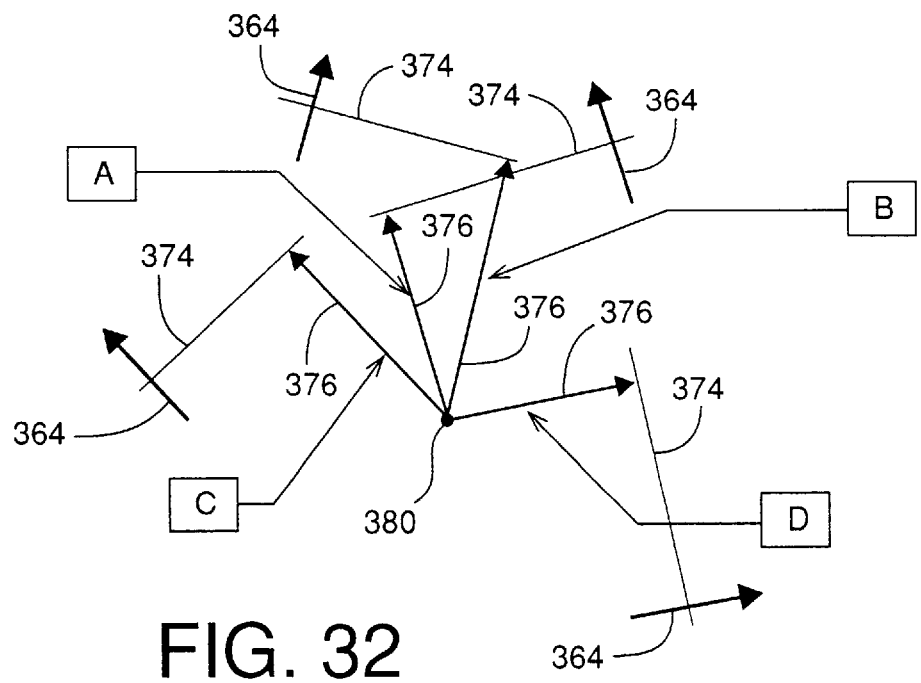
FIG. 32 is a view for explaining the manner in which a dimension center is determined on the image of FIG. 30.
Figure 33:
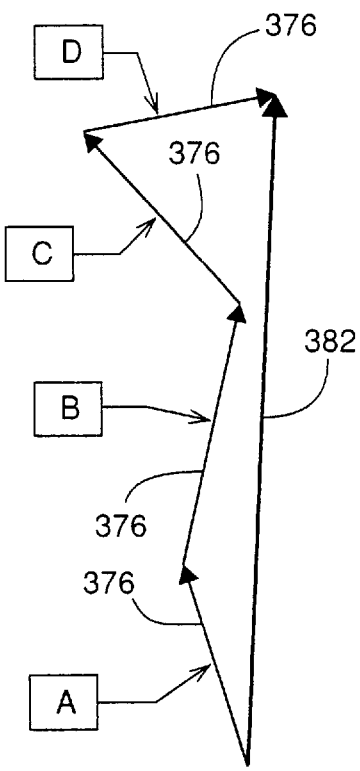
FIG. 33 is another view for explaining the manner in which the dimension center is determined on the image of FIG. 30.

The dimension center 372 can be determined such that even if the image 360 or the object 180 is deviated by small distances from its reference X-direction and Y-direction positions in any direction and/or is rotated by a small angle from its reference rotation position in any direction, the above-indicated sum of the products of the edge-point deviations 370 and the parallel-direction distances 376 does not change. More specifically, the dimension center 372 is determined, as shown in FIGS. 32 and FIG. 33, such that a temporary dimension center 380 is determined from which all the parallel vectors 376, e.g., four vectors A, B, C, and D, extend outward, and is moved to a position where a sum 382 of all the parallel vectors 376 (the vectors A, B, C, D) is zero. This position is determined as the dimension center 372. The dimension center 372 can be said as a point or position with respect to which a dimension of the image 360 is magnified or reduced.

Figure 34:
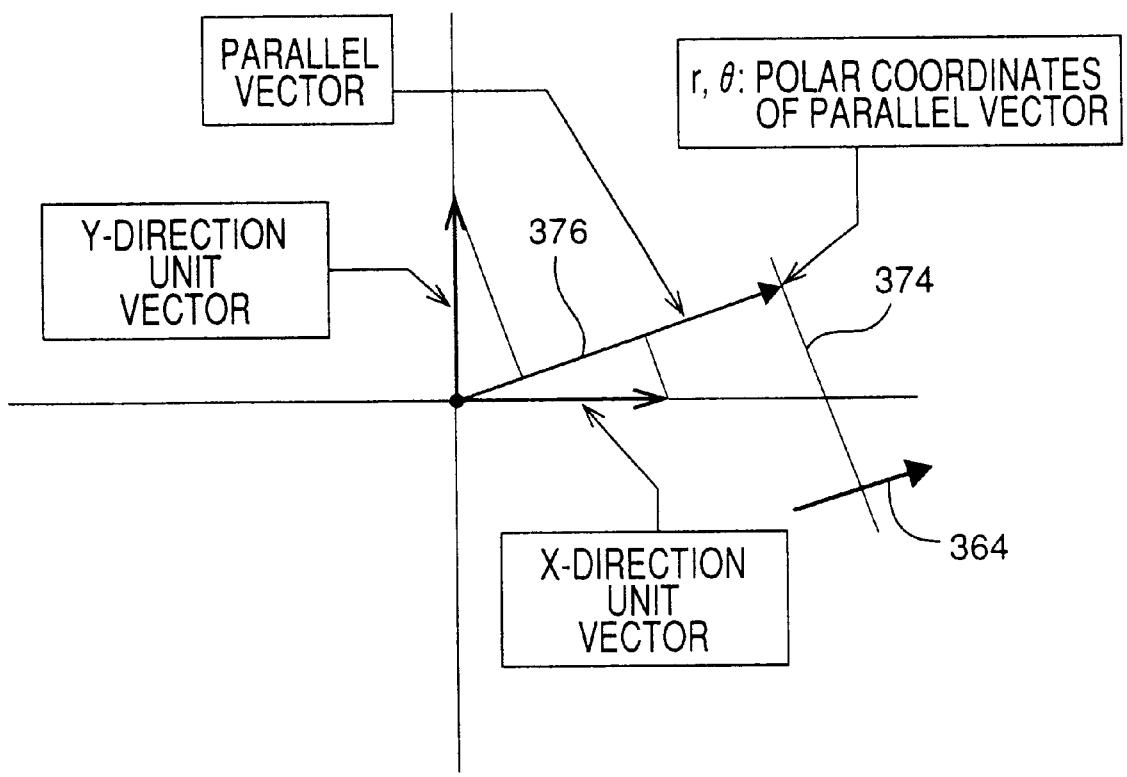
FIG. 34 is yet another view for explaining the manner in which the dimension center is determined on the image of FIG. 30.

The calculations needed to determine the dimension center 372 may be carried out in the following manner: FIG. 34 shows a representative one of the parallel vectors 376. The one parallel vector 376 is indicated by polar coordinates (r, Θ). An increase, drxr, of the coordinate, r, of the parallel vector 376 when the temporary dimension center 380 (i.e., the start end of the vector 376) is moved by a unit distance in the X direction, is as follows:

$$drxr = -\cos(\Theta)$$

Therefore, an increase, drx[X], of an x coordinate, and an increase, dry[X], of a y coordinate of the parallel vector 376 are as follows:

$$drx[X] = drxr \cdot \cos(\Theta) = -\cos(\Theta) \cdot \cos(\Theta)$$

$$dry[X] = drxr \cdot \sin(\Theta) = -\cos(\Theta) \cdot \sin(\Theta)$$

Likewise, an increase, dryr, of the coordinate r of the parallel vector 376 when the temporary dimension center 380 is moved by a unit distance in the Y direction, is as follows:

$$dryr = -\sin(\Theta)$$

Therefore, an increase, drx[Y], of the x coordinate, and an increase, dry[Y], of the y coordinate of the parallel vector 376 are as follows:

$$drx[Y] = dryr \cdot \cos(\Theta) = -\sin(\Theta) \cdot \cos(\Theta)$$

$$dry[Y] = dryr \cdot \sin(\Theta) = -\sin(\Theta) \cdot \sin(\Theta)$$

Since the above-indicated increase values drx[X], dry[X], drx[Y], dry[Y] are proper values for each of the search lines 364, those values are calculated when the calculation performing program is compiled, so that they are included in appropriate portions of the search-line structure (i.e., the batch of data relating to the search lines 364). Thus, the time needed to measure the image 360 can be shortened.

In this way, the increase values drx[X], dry[X], drx[Y], dry[Y] for each of all the parallel vectors 376 are obtained. Then, a sum, sumdrx[X], of the respective increase values drx[X] of all the vectors 376, a sum, sumdry[X], of the respective increase values dry[X] of all the vectors 376, a sum, sumdrx[Y], of the respective increase values drx[Y] of all the vectors 376, a sum, sumdry[Y], of the respective increase values dry[Y] of all the vectors 376 are calculated. Since those sum values sumdrx[X], sumdry[X], sumdrx[Y], sumdry[Y] are also proper values for each image 360 or each object 180 so long as no failure occurs, those values are calculated when the calculation performing program is compiled, so that they are included in appropriate portions of the search-line structure (i.e., the batch of data relating to the search lines 364). Thus, the time needed to measure the image 360 can be shortened. If one or more failures occur, the foregoing and following calculations are performed with respect to all the search lines 364 except for one or more search lines 364 to which one or more failures have occurred.

Assuming that the vector sum 382 of all the parallel vectors 376 has x and y coordinates, (xx, yy), corresponding to the temporary dimension center 380, the following simultaneous equations are obtained if the temporary dimension center 380 is moved to the true dimension center 372 by unknown values, x and y, in the X and Y directions, respectively:

$$xx = -(\text{sum}drx[X] \cdot x + \text{sum}drx[Y] \cdot y)$$

$$yy = -(\text{sum}dry[X] \cdot x + \text{sum}dry[Y] \cdot y)$$

Since the x and y coordinates, xx, yy, of the vector sum 382 are known, the unknown values x, y are obtained by solving the above simultaneous equations. If the value x or y has a plus sign, it means that the temporary dimension center 380 is moved in a positive direction of the X or Y direction; and if the value x or y has a minus sign, it means that the temporary dimension center 380 is moved in a negative direction of the X or Y direction.

The true dimension center 372 must be determined for each re-seek template or each measure template.

Figure 31:
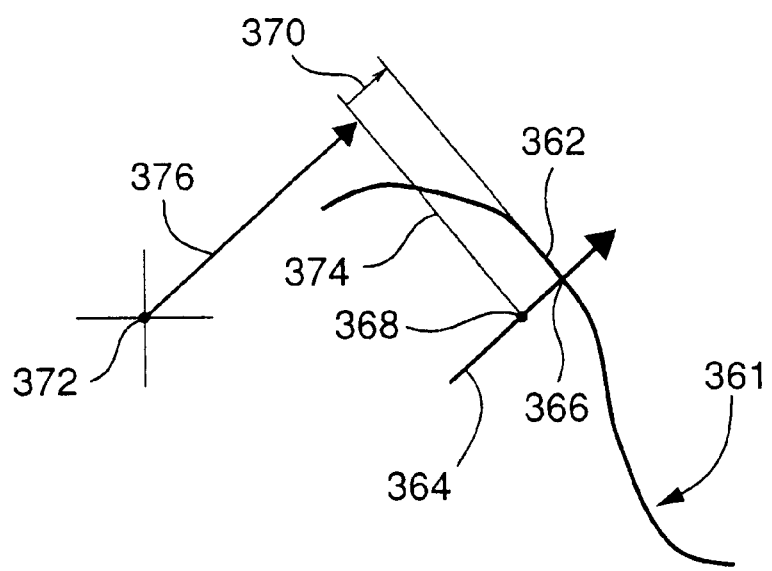
FIG. 31 is a view for explaining a parallel vector and an edge-point deviation on the image of FIG. 30.
Figure 36:
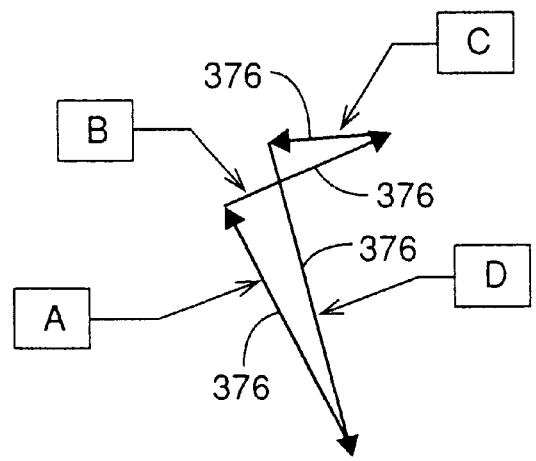
FIG. 36 is another view of the dimension center determined on the image of FIG. 30.

The sum of all the parallel vectors 376 that start, as shown in FIG. 35, at the thus determined true dimension center 372 is zero as shown in FIG. 36. The edge-point deviations 370 corresponding to the parallel vectors 376, as shown in FIG. 31, are calculated, and the dimension-difference rate, k, is obtained by dividing the sum of the products of the edge-point deviations 370 and the parallel-direction distances 376 by the sum of respective squares of the parallel-direction distances 376, for example, as follows:

$$k = (A \cdot \Delta A + B \cdot \Delta B + C \cdot \Delta C + D \cdot \Delta D)/(A^2 + B^2 + C^2 + D^2)$$

where the values A, B, C, D are the lengths of the parallel vectors A, B, C, D shown in FIG. 35, respectively, and the values ΔA, ΔB, ΔC, ΔD are the edge-point deviations corresponding to the vectors A, B, C, D.

Every parallel vector 376 extends in an outward direction from the temporary dimension center 380. However, a parallel vector 376 may have a direction opposite to that of a corresponding search line 364, like the parallel vector C and the corresponding search line 364 shown in FIG. 35. The parallel-direction distance, i.e., length of that parallel vector 376 (e.g., the parallel vector C) has a minus sign when occurring to the above expression.

The thus obtained dimension-difference rate k can be said as a dimension-error rate which is a ratio of a dimensional error obtained by subtracting the reference dimension from the actual dimension, to the reference dimension. Therefore, if the reference dimension is multiplied by the dimension-difference rate k, the dimensional error is obtained; and if the reference dimension is multiplied by (1+k), the actual dimension is obtained. The rate k may be either plus or minus.

Next, the calculation of rotation angle (i.e., angular deviation) will be described in detail. The rotation angle is determined based on based on the sum of a plurality of products each of which is obtained by multiplying a corresponding one of the respective edge-point deviations 370 (FIG. 37) of the respective actual edge points 366 where the search lines 364 perpendicularly intersect the straight portions 362 of the edge 361, respectively, from the respective reference edge points 368 pre-determined on the search lines 364, in respective directions parallel to the search lines 364, by a corresponding one of respective perpendicular-direction distances 394 of the search lines 364 from a rotation center 390 of the image 360 in respective directions perpendicular to the search lines 364. Each of the perpendicular-direction distances 394 can be said as a perpendicular vector perpendicular to the direction of the corresponding one of the search lines 364, and has a plus sign when having a positive direction (i.e., a counterclockwise direction in FIG. 37) of the one search line 364 and a minus sign when having a negative direction (i.e., a clockwise direction in FIG. 37) of the same 364. Each perpendicular vector 394 starts at the rotation center 390 and ends on a straight line 392 which includes the corresponding search line 364. FIG. 38 shows four perpendicular vectors, E, F, G, and H, as examples of the vectors 394.

Figure 38:
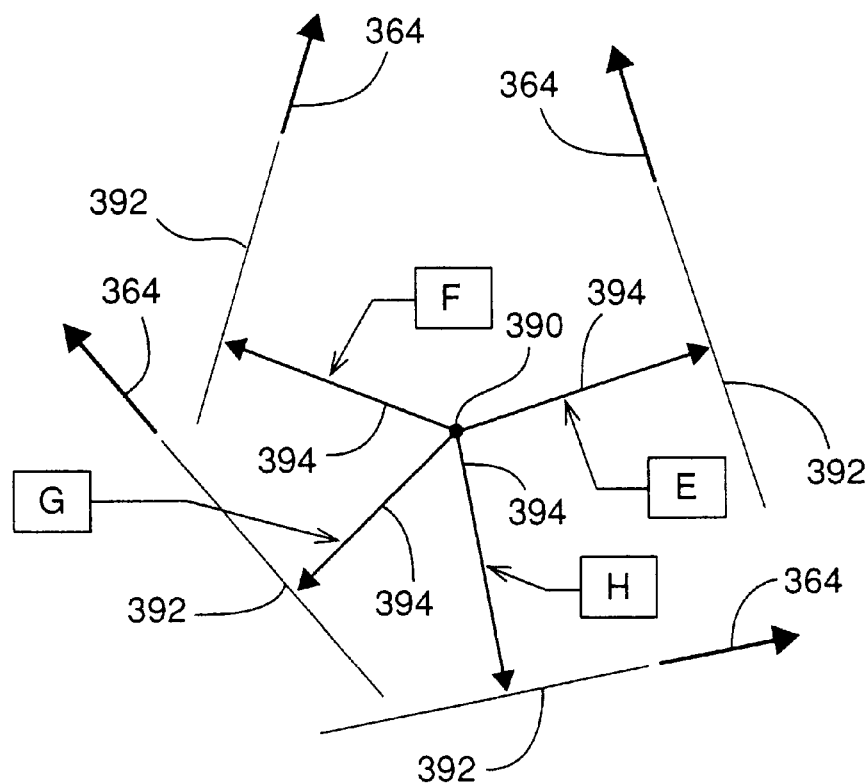
FIG. 38 is a view for explaining the manner in which a rotation center is determined on the image of FIG. 30.
Figure 39:
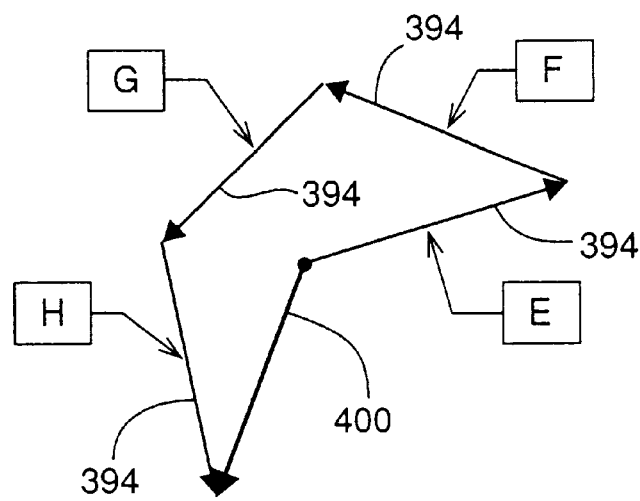
FIG. 39 is another view for explaining the manner in which the rotation center is determined on the image of FIG. 30.

The rotation center 390 can be determined such that even if the image 360 or the object 180 is deviated by small distances from its reference X-direction and Y-direction positions in any direction, the above-indicated sum of the products of the edge-point deviations 370 and the perpendicular-direction distances 394 does not change. More specifically described, the rotation center 390 is determined, as shown in FIGS. 38 and FIG. 39, such that a temporary rotation center is determined from which all the perpendicular vectors 394, e.g., four vectors E, F, G, and H, extend outward, and is moved to a position where a sum 400 of all the perpendicular vectors 394 (the vectors E, F, G, H) is zero. This position is determined as the rotation center 390. The rotation center 390 can be said as a point or position about which the image 360 is rotated from its reference rotation position. The concrete calculations for determining the rotation center 390 are the same as those for determining the dimension center 372, and the description thereof is omitted.

Figure 37:
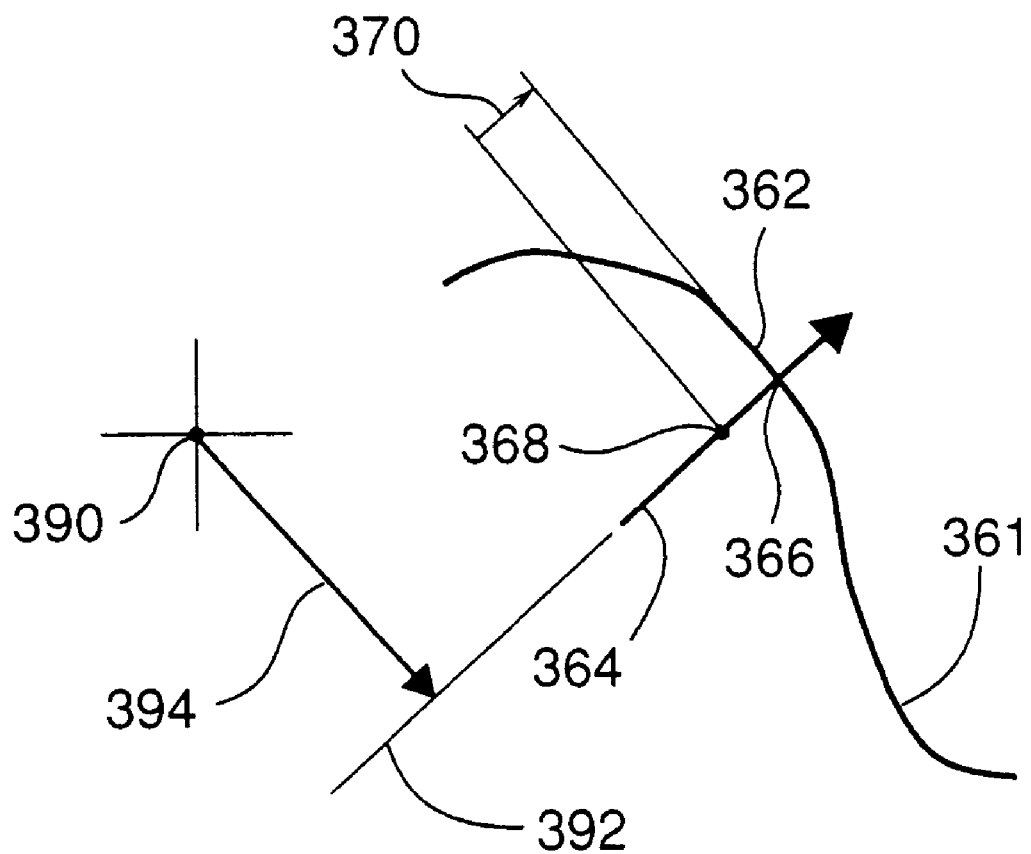
FIG. 37 is a view for explaining a perpendicular vector and the edge-point deviation on the image of FIG. 30.

Then, the perpendicular vectors 394 corresponding to all the search lines 364 are determined with respect to the thus determined rotation center 390, and the edge-point deviations 370 corresponding to all the perpendicular vectors 394, as shown in FIG. 37, are calculated. In addition, the rotation angle, α (radian), is obtained by dividing the sum of the products of the edge-point deviations 370 and the perpendicular-direction distances 394 by the sum of respective squares of the perpendicular-direction distances 394, for example, as follows:

$$\alpha = (E \cdot \Delta E + F \cdot \Delta F + G \cdot \Delta G + H \cdot \Delta H)/(E^2 + F^2 + G^2 + H^2)$$

where the values E, F, G, H are the lengths of the perpendicular vectors E, F, G, H, respectively, and the values ΔE, ΔF, ΔG, ΔH are the edge-point deviations corresponding to the vectors E, F, G, H.

The thus obtained rotation angle α has a plus sign when the actual image 360 is rotated about the rotation center 390 in the same direction as the positive direction (i.e., the counterclockwise direction in FIG. 38) of each search line 364.

The foregoing description relating to the calculation of rotation angle is made, for easier understanding purposes only, on the assumption that there is no dimensional error with the image 360. However, in the case where the image 360 has a substantial dimensional error (for example, an error which does not fall within a predetermined permissible range), a plurality of search lines 364 are produced for the straight portions 362 of the edge 361 of the image 360, by taking into account the dimension-difference rate that has been obtained by the above-described dimension measurement carried out before the calculation of rotation angle. In other words, the actual dimension of the image 360 is utilized in place of its reference dimension, for producing an individual re-seek template, an individual measure template, etc. Thus, the possibility of occurrence of failure is reduced even when objects 180 possibly having great dimension errors or differences are subjected to the re-seek step, the measure step, the re-measure step, etc.

Next, the calculation of positional deviation will be described. The calculation of a positional deviation of the image 360 means the calculation of a positional deviation of a designated point designated by an operator or a user on the image 360. The rotation angle of the actual image 360 about the rotation center 390 is equal to that about the designated point (i.e., designated center), but the positional deviation of the designated point of the image 360 differs from that of the rotation center 390 of the image 360 if the designated point differs from the rotation center 390 and the actual image 360 is not at its reference rotation position. Accordingly, the positional deviation of the designated point must be calculated based on the positional deviation of the actual rotation center 390 of the image 360 from its reference rotation center. Alternatively, it is possible to calculate the positional deviation of the designated point based on the positional deviation of the actual dimension center 372 of the image 360 from its reference dimension center. In the present optical measuring apparatus, the positional deviation of the designated point is calculated based on the positional deviation of the actual rotation center 390.

Figure 40:
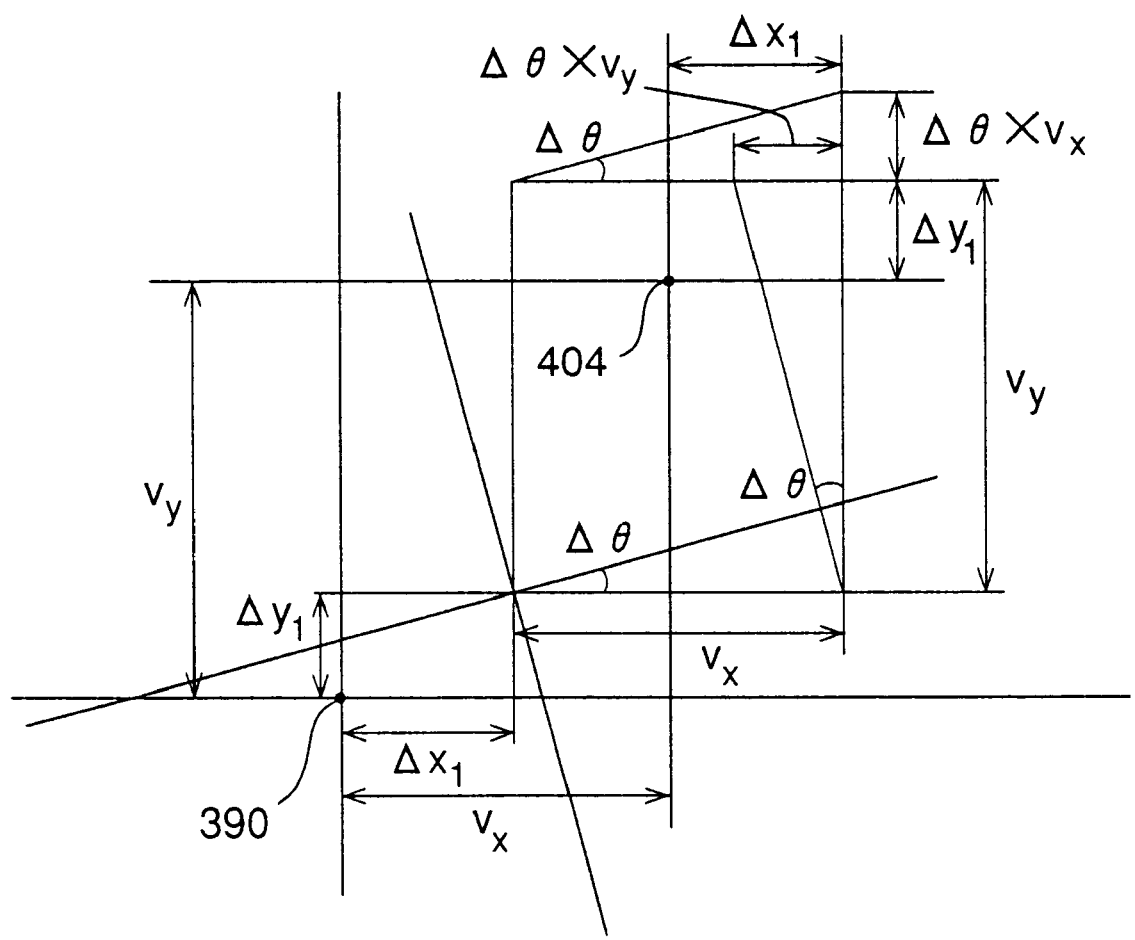
FIG. 40 is a view for explaining a manner in which an actual position of a designated center of an image is calculated in the case where there is a distance between the designated center and the rotation center of the image and there are a positional deviation and a rotation angle (i.e., an angular deviation) of the image.

The positional deviation of the designated point is calculated based on the positional deviation of the rotation center 390 and the rotation angle of the image 360 about the rotation center 390. In the case where the actual image 360 has a rotation angle, ΔΘ, the positional deviations of a designated point or center 404 that are distant by respective distances, $v_x$, $v_y$, from the rotation center 390 in the X and Y directions, respectively, are equal to values, $(\Delta x_1 - \Delta \Theta \times v_y)$ and $(\Delta y_1 + \Delta \Theta \times v_x)$, respectively, as illustrated in FIG. 40.

Figure 41:
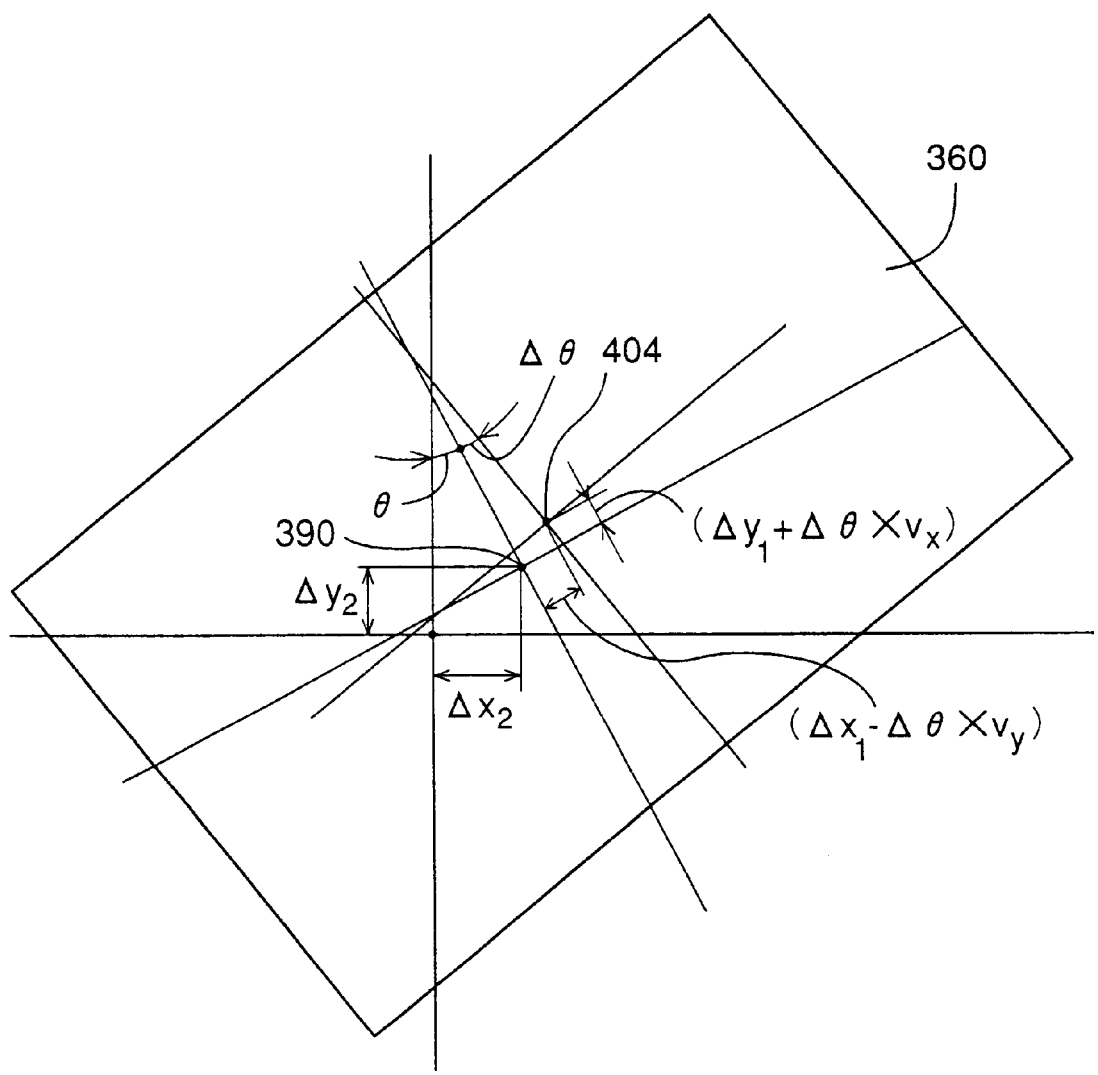
FIG. 41 is a view for explaining a manner in which a positional deviation and a rotation angle of an image relative to a reference coordinate plane are calculated.

The thus obtained rotation angle $\Delta\Theta$ and the positional deviations $(\Delta x_1 - \Delta\Theta \times v_y)$, $(\Delta y_1 + \Delta\Theta \times v_x)$ are those of the designated center 404 of the image 360 on the individual-measure-template coordinate plane. However, usually, the individual-measure-template coordinate plane has, as shown in FIG. 41, a rotation angle, $\Theta$, and positional deviations, $\Delta_{x2}$, $\Delta_{y2}$, relative to the reference coordinate plane that usually has its origin on the optical axis (i.e., the center of the field of view) of the CCD camera 78. Thus, the rotation angle of the image 360 (indicated at a rectangular shape in FIG. 41 for easier understanding purposes only) relative to the reference coordinate plate, and the positional deviations of the designated center 404 relative to the origin of the reference coordinate system are equal to $(\Theta + \Delta\Theta)$, $\{\Delta x_2 + (\Delta x_1 - \Delta\Theta \times v_y) \times \cos\Theta\}$, and $\{\Delta y_2 + (\Delta y_1 + \Delta\Theta \times v_x) \times \sin\Theta\}$, respectively.

An object whose positional deviation and rotation angle are determined by the image processing device 12 may be an electric component ("EC") which is held by vacuum by an EC suction nozzle of an EC mounting system. Since the EC mounting system mounts each EC on a printed circuit board after correcting a positional error and an angular error of the EC held by the suction nozzle, it is needed to determine a positional error of a designated center of the EC relative to an axis line of the suction nozzle and a rotation angle of the EC relative to the axis line of the nozzle.

Figure 42:
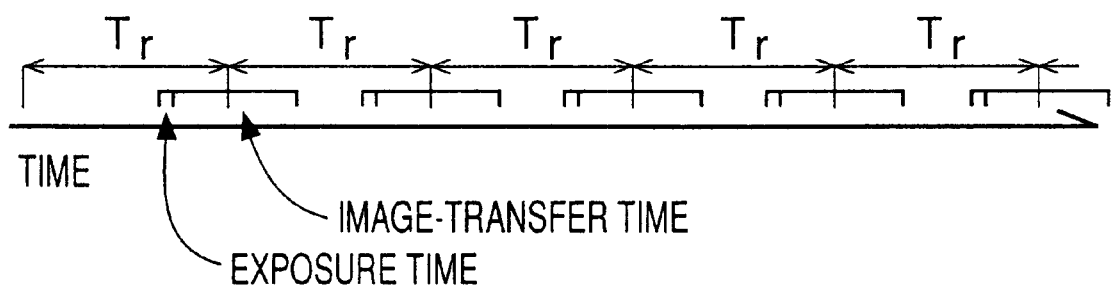
FIG. 42 is a view for explaining one feature of the image processing device of FIG. 10.

The present optical measuring apparatus has the function of processing concurrently four batches of image data representing respective images of four objects 180. This function is very effective in the case where it is needed to measure, in a very short time, a dimension-difference rate, a positional deviation, and a rotation angle of an object, in, e.g., an EC mounting system. For example, as indicated on a time chart of FIG. 42, during a cycle time, $T_r$, needed to move an EC to an image-taking position and stop it thereat, an image of the EC is taken by the CCD camera 78. Subsequently, a batch of image data representing the taken image of the EC is transferred from the CCD camera 78 to an appropriate one of the four FGMs 264, and is processed by the computer. The transferring of a batch of image data and the processing of another batch of image data are performed concurrently with each other.

The four FGMs 264 can store four batches of image data representing respective images of four ECs, independent of one another. Therefore, a time needed to complete image processing of one of the four ECs may be longer than the cycle time $T_r$ needed to mount each of the four ECs. Image processing of an EC has only to end before the results of image processing are actually used. In the case where, after an image of an EC is taken, a plurality of different ECs are mounted before the results of image processing of the taken image are used, it is not essentially required that the image processing be completed during one EC-mount cycle time $T_r$. The image processing device 12 can complete, while a predetermined number of ECs are mounted, the image processing of the same number of ECs. For example, the computer of the processing device 12 can complete the image processing of one EC while the other three ECs are mounted, in such a manner that a time needed to image-process the one EC is longer by some excessive time than one EC-mount cycle time $T_r$ but a time needed to image-process another EC is shorter than one EC-mount cycle time $T_r$ by a time equal to, or longer than, the above excessive time.

ECs which are mounted on a printed circuit board may include one having no lead wires and accordingly having a simple edge shape, such as a rectangular EC chip, and one having a number of lead wires and accordingly having a complex edge shape, such as a QFP chip. The image processing of a simple EC needs only a short time, whereas the image processing of a complex EC needs a long time. The image processing device 12 can image-process a complex EC in a time longer than an EC-mount cycle time $T_r$, while utilizing a time by which a time needed to image-process a simple EC is shorter than the EC-mount cycle time $T_r$, if image processing of each of different sorts of ECs must be completed in a predetermined EC-mount cycle time $T_r$, the cycle time $T_r$ must be predetermined to be equal to, or longer than the longest one of respective times needed to image-process all the sorts of ECs. This leads to lowering the EC mounting efficiency. In contrast, the image processing device 12 has the four FGMs 264 which can store four batches of image data, respectively, independent of one another, and can process the four batches of image data in a time equal to four EC-mount cycle times, i.e., $4 \times T_r$, if the sum of respective times needed to process the four batches of image data is not longer than the four EC-mount cycle times ($4 \times T_r$). In other words, the processing device 12 can process a plurality of batches of image data in such a manner that an average of respective times needed to process the batches of image data is not longer than the EC-mount cycle time $T_r$. This leads to shortening the EC-mount cycle time $T_r$.

Figure 43:
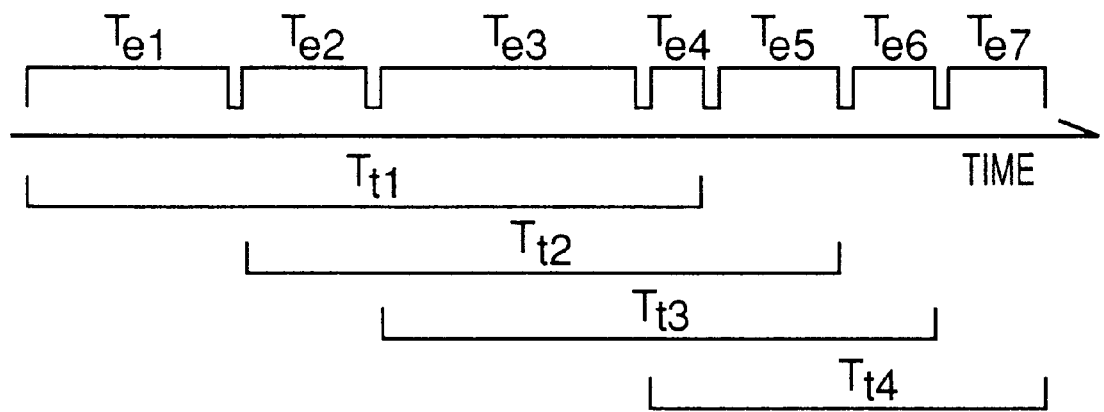
FIG. 43 is a view for explaining another feature of the image processing device of FIG. 10.

FIG. 43 shows an example of respective times, $T_{e1}$ to $T_{e7}$ which are needed to image-process seven ECs, respectively. The image-process times $T_{e1}$ to $T_{e7}$ differ from one another such that some are longer, and some are shorter, than a predetermined cycle time $T_r$ (FIG. 42) needed to mount each EC. However, as can be seen from FIG. 43, each of respective combined times, $T_{t1}$ to $T_{t4}$, that is needed to image-process a corresponding one of four groups of successive ECs (each group includes four ECs) is shorter than a time equal to four EC-mount cycle times, $4 \times T_r$. Thus, the cycle time $T_r$ can be shortened.

The above-indicated advantage of the plurality of FGMs 264 is also enjoyed in the case where mixed objects 180 of different sorts are successively conveyed by an object conveying device (not shown) to the present optical measuring apparatus. For example, even if respective times needed for the present apparatus to measure and/or inspect respective sorts of objects 180 may differ from each other, the object conveying device can successively convey the objects 180 at a cycle time about an average of respective times needed to measure and/or inspect the same number of successive objects 180 as the number (e.g., 4) of the FGMs 264. Even in the case where only a single sort of successive objects 180 are sequentially measured and/or inspected by the optical measuring apparatus, such that respective times needed to measure and/or inspect those objects 180 are equal to each other, the above-explained advantage of the FGMs 264 is also enjoyed if the CCD camera 78 takes respective images of the objects 180 at irregular time intervals, because a time or times can be given and taken between or among respective times needed for the CCD camera 78 to take the respective images of the objects 180.

As can be understood from the foregoing description, the image processing device 12 processes, by using the pattern matching or the pattern matching manager, a batch of image data representing an image taken by the CCD camera 78 of the object 180 to be measured and/or inspected. In the pattern matching or the pattern matching manager, a seek template, a re-seek template, a measure template, a re-measure template, and an inspect template are used to seek an object to be measured and/or inspected and determine edge points of the object. Thus, only portions of the image of the object that correspond to those templates are sought, measured, and inspected. That is, only portions of the image that need to be processed are processed, and the other portions of the image that need not be processed are not processed. Accordingly, the image-processing of the image data can be completed in a short time. In addition, the image-processing is not adversely affected by almost all sorts of image noise (e.g., white or black spots), unless the image noise directly rides on the image.

In the seek step, the image processing device 12 judges whether the difference of respective optical characteristic values (e.g., luminance values) of each pair of points of an individual seek template satisfy the predetermined condition; and in each of the re-seek step, the measure step, the re-measure step, and the inspect step, the processing device 12 determines, on each search line, an edge point based on the rate of change of respective optical characteristic values (e.g., luminance values) of division points designated on the each search line. Thus, even in the case where an object being image-processed is considerably large like a QFP-type EC and accordingly respective portions of the object may be unevenly lighted, the processing device 12 compares respective characteristic values of respective portions of the object that are lighted under substantially the same condition, with each other. Thus, the image processing device 12 can accurately process image data without being adversely influenced by a possible uneven lighting of the object.

In addition, search lines of a re-seek template or a master measure template need not be parallel to the X or Y axis of an X-Y coordinate plane on which the template is defined, or need not be paired. Thus, the optical measuring apparatus can easily measure a dimension, etc. of an object having a complex shape and judge whether the object has an appropriate dimension.

In the illustrated embodiment, the image processing device 12 can know, in advance, the shape and dimensions of an object to be measured and/or inspected, and utilizes this fact in performing a special image processing operation in which the seek template 300, the re-seek template 328, the measure template 336, the re-measure template, and the inspect template are used to measure a dimension of the object and judge whether the object has an appropriate dimension. Therefore, the processing device 12 can complete the image processing operation in a short time. In addition, since the object supporting device 58 includes the glass plate 54 that is a transparent flat plate and the various sorts of templates 300, 328, 336 are automatically produced based on the position and rotation angle of the object 180, the operator has only to place the object 180 on the glass plate 54. That is, even if the operator may place the object 180 at inaccurate position and/or rotation angle, the image processing device 12 measures and inspects the dimension of the object 180. Thus, each object 180 can be easily set on the image taking device 10. Moreover, since the operator can input, through the foot switch 22, a command to start the image processing operation of the processing device 12, the operator can use his or her two hands in a different operation. In this respect, too, the present optical measuring apparatus can be used with ease. Furthermore, the present apparatus need not fix an object 180 to be measured and/or inspected, and may measure one or more dimensions of the object 180 without physical contact therewith. Therefore, the present apparatus can easily measure and inspect one or more dimensions of a product formed of, e.g., rubber or soft synthetic resin. Thus, the present apparatus can perform even an each-individual dimension inspection in which one or more dimensions of each individual of a great number of injection-molded or press-molded products are measured. In addition, the present apparatus can inspect not only a dimension of a predetermined portion of a product, such as the inner diameter of a through-hole, a pitch at which an array of holes are formed, a pitch at which an array of projections are formed, the outer diameter of a cylindrical tube, the distance between two flanges, or the length of an axis member, but also inspect whether a product has one or more portions which should have been worked but in fact have not been worked yet, or whether a product has lost one or more parts.

It emerges from the foregoing description that in the present embodiment, a portion of the image processing device 12 that produces an individual re-seek template based on an individual seek template which is judged in the seek step to satisfy a predetermined condition, and a portion of the device 12 that produces an individual measure template based on a master measure template stored in the DRAM 256 and the results obtained in the re-seek step cooperate with each other to provide a search-line producing means; and a portion of the device 12 that calculates the sum $(A \cdot \Delta A + B \cdot \Delta B + C \cdot \Delta C + D \cdot \Delta D)$ provides a first product-sum obtaining means; and a portion of the device 12 that calculates the sum $(E \cdot \Delta E + F \cdot \Delta F + G \cdot \Delta G + H \cdot \Delta H)$ provides a second product-sum obtaining means.

In addition, the FGMs 264 of the image processing device 12 provide an image-data memory in which the image data is stored; the DRAM 256 provides the seek-template-data memory and the measure-template-data memory. A portion of the processing device 12 that carries out the seek step solely, or both the seek step and the re-seek step, of the pattern matching program, provides an object judging means for judging whether an object being image-processed is one being sought. A portion of the processing device 12 that carries out the seek step, the re-seek step, the measure step, and the re-measure step of the pattern matching program, provides a measuring device which measures at least one of a dimension, a position, and a rotation angle of the object, and a portion of the measuring device that determines a position of an edge point in each of the re-seek step, the measure step, and the re-measure step, provides an edge-point-position determining means. A portion of the processing device 12 that designates a virtual point whose luminance value is to be calculated in each of the seek step, the re-seek step, the measure step, and the re-measure step of the pattern matching program, provides a virtual-point designator. A portion of the processing device 12 that calculates a luminance value of the designated virtual point, provides a virtual-point-data calculating means. A portion of the image processing device 12 that compares the measured dimension of the object with a reference dimension and judges whether the object passes the dimension inspection, provides a dimension inspecting means.

In the illustrated embodiment, the image processing device 12 carries out the re-seek step just one time. However, the processing device 12 may be modified to repeat the re-seek step. More specifically described, after in the first re-seek step not more than the predetermined number of failure search lines are found and the edge points of the object 180 are determined, another re-seek template is produced and another re-seek step is carried out. The processing device 12 produces the another or second re-seek template, based on the first re-seek template used in the previous re-seek step and the respective positions of the edge points determined in that step, such that the second re-seek template has smaller positional and angular errors relative to the object 180 than the first re-seek template. Experiences show that the possibility that at least one failure occurs to at least one search line in the following measure step is lower when the re-seek step is repeated than when the re-seek step is carried out just one time. The reason for the above experiences has not been elucidated. However, it has been suggested that if in the seek step an object being image-processed is narrowly judged as an object being sought, though there are considerably large errors between the seek template and the object being image-processed, there is some possibility that large errors may occur between a re-seek template and the object being image-processed, which may lead to some possibility in the following measure step as well that large errors may occur between a measure template and the object being image-processed and accordingly at least one failure may occur to at least one search line. In contrast, if the re-seek step is repeated, the above possibility may decrease in the measure step.

In a particular case where the image processing device 12 can know, in advance, the shape, and rough position and rotation angle, of an object being image-processed, the processing device 12 can accurately place, without having to use a seek template to seek the object, search lines of a measure template just on an edge of the object and determine respective edge points on the search lines. In this case, the seek step is omitted.

In the illustrated embodiment, the measure step is carried out after the re-seek step is carried out using a re-seek template. However, in a particular case where it is known in advance that an object being image-processed has only small dimension errors and/or small shape-related defects, the measure step may be carried out to follow the seek step. The re-seek step is omitted. In this case, a re-seek template to be used in the re-seek step may be used as a measure template in the measure step. However, it is preferred to employ, as a measure template, a template which includes more search lines than those of the re-seek template.

In the illustrated embodiment, the image processing device 12 judges whether an abnormality has occurred to the pattern matching operation, by judging whether more than the predetermined or programmed number of permissible failures have occurred. However, the present invention is not limited to this judging manner. For example, the processing device 12 may select, in response to a selection command input by the operator, either one of a first program which commands calculations of object vectors with respect to only objects each without any failures, and a second program which allows objects each with not more than the predetermined number of failures and commands calculations of object vectors with respect to only the allowed objects. Since each batch of image data can be processed in a short time according to the first program, the operator can select the first program depending on the circumstances to improve the inspection efficiency of objects 180, or shorten a time needed to mount each EC.

In the illustrated embodiment, the image processing device 12 seeks, in a taken image, an edge at which the optical characteristic of the image significantly changes, in such a manner that the processing device 12 first seeks, in a seek template, each pair of points whose respective optical characteristic values have a difference from each other greater than a reference value, and then determines, as an edge point, a position where the differential values of optical characteristic values obtained on each search line (i.e., measuring search line) of a measure template take a maximum. However, the present invention is not limited to this manner. For example, the processing device 12 may be modified to determine, as an edge point, a position where the differential values of optical characteristic values obtained on each search line of a measure template take a value greater than a reference value. In the latter case, a plurality of continuous positions may be determined as continuous edge points on each search line. In the last case, the processing device 12 may determine, as a proper edge point, one of the edge points that corresponds to a maximum differential value.

While in the illustrated embodiment the search lines 364 have respective directions from inside of the edge 361 toward outside, it is possible to employ search lines which have respective directions from outside of the edge 361 toward inside. In addition, it is possible to employ search lines some of which have respective directions from inside of the edge 361 toward outside and the others of which have respective directions from outside of the edge 361 toward inside. Moreover, under a particular condition, e.g., a condition that a dimension of an object 180 to be image-processed is known in advance to be greater, or smaller, than its reference dimension, or a condition that a rotation angle of an object 180 to be image-processed is known in advance to be plus, or minus, with respect to its reference rotation position, the edqe-point deviations 370, the parallel-direction distances 376, and the perpendicular-direction distances 394 may be handled as scalar values.

It is to be understood that the present invention may be embodied, in addition to any one of the first to fourteenth features (1) to (14), with other changes, improvements, and modifications that may occur to a person skilled in the art without departing from the scope and spirit of the invention defined in the appended claims.

What is claimed is:

1. A method of processing an image of an object to obtain a dimension-difference relating amount which relates to a difference of an actual dimension of the object from a reference dimension thereof, the method comprising the steps of:

producing a plurality of search lines each of which perpendicularly intersects a corresponding one of a plurality of substantially straight portions of an edge of the image of the object, and obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines.

2. A method according to claim 1, further comprising determining, as the dimension center of the image of the object, a point from which a plurality of parallel vectors a sum of which is zero start, extend parallel to the search lines, respectively, and end on respective straight lines which perpendicularly intersect the search lines, respectively, at the respective reference edge points thereof.

3. A method according to claim 1, wherein the dimension-difference relating amount comprises a dimension-difference rate which is obtained by dividing the sum of the products by a sum of respective squares of the respective parallel-direction distances.

4. A method of processing an image of an object to obtain a rotation angle of an actual rotation position of the object from a reference rotation position thereof, the method comprising the steps of:

producing a plurality of search lines each of which perpendicularly intersects a corresponding one of a plurality of substantially straight portions of an edge of the image of the object, and obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines.

5. A method according to claim 4, further comprising determining, as the rotation center of the image of the object, a point from which a plurality of perpendicular vectors a sum of which is zero start, extend perpendicularly to the search lines, respectively, and end on respective straight lines which include the search lines, respectively.

6. A method according to claim 4, wherein the rotation angle is obtained by dividing the sum of the products by a sum of respective squares of the respective perpendicular-direction distances.

7. A method of processing an image of an object to obtain a dimension-difference relating amount which relates to a difference of an actual dimension of the object from a reference dimension thereof, and obtain a rotation angle of an actual rotation position of the object from a reference rotation position thereof, the method comprising the steps of:

producing a plurality of search lines each of which perpendicularly intersects a corresponding one of a plurality of substantially straight portions of an edge of the image of the object, obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines, and obtaining the rotation angle based on a sum of a plurality of products each of which is obtained by multiplying a corresponding one of the respective edge-point deviations of the respective actual edge points from the respective reference edge points, in the respective directions parallel to the search lines, by a corresponding one of respective perpendicular-direction distances of the search lines from a rotation center of the image of the object in respective directions perpendicular to the search lines.

8. A method according to claim 7, wherein the step of obtaining the rotation angle comprises obtaining the rotation angle, using the search lines produced based on the obtained dimension-difference relating amount.

9. A method of processing an actual image of an object to obtain a deviation of an actual position of the object from a reference position thereof, the method comprising the steps of:

producing a plurality of search lines each of which perpendicularly intersects a corresponding one of a plurality of substantially straight portions of an edge of a reference image of the object, at a corresponding one of a plurality of reference edge points; and obtaining the deviation based on a deviation of an actual position of a dimension center of the object with respect to the actual image of the object from a reference position of the dimension center of the object with respect to the reference image thereof, the dimension center of the object being a point from which a plurality of parallel vectors a sum of which is zero start, extend parallel to the search lines, respectively, and end on respective straight lines which perpendicularly intersect the search lines, respectively, at the respective reference edge points.

10. A method of processing an actual image of an object to obtain a deviation of an actual position of the object from a reference position thereof, the method comprising the steps of:

producing a plurality of search lines each of which perpendicularly intersects a corresponding one of a plurality of substantially straight portions of an edge of a reference image of the object; and obtaining the deviation based on a deviation of an actual position of a rotation center of the object with respect to the actual image of the object from a reference position of the rotation center of the object with respect to the reference image thereof, the rotation center of the object being a point from which a plurality of perpendicular vectors a sum of which is zero start, extend perpendicularly to the search lines, respectively, and end on respective straight lines which include the search lines, respectively.

11. An apparatus for processing an image of an object to obtain a dimension-difference relating amount which relates to a difference of an actual dimension of the object from a reference dimension thereof, the apparatus comprising:

search-line producing means for producing a plurality of search lines each of which perpendicularly intersects a corresponding one of a plurality of substantially straight portions of an edge of the image of the object; and product-sum obtaining means for obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines.

12. An apparatus for processing an image of an object to obtain a rotation angle of an actual rotation position of the object from a reference rotation position thereof, the apparatus comprising:

search-line producing means for producing a plurality of search lines each of which perpendicularly intersects a corresponding one of a plurality of substantially straight portions of an edge of the image of the object; and product-sum obtaining means for obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines.

13. A recording medium on which an image-processing control program is recorded which is readably by a computer and is usable by the computer to process image data representing an image of an object taken by an image taking device, for obtaining a dimension-difference relating amount which relates to a difference of an actual dimension of the object from a reference dimension thereof, the image data being stored in an image-data memory, the control program comprising the steps of:

producing a plurality of search lines each of which perpendicularly intersects a corresponding one of a plurality of substantially straight portions of an edge of the image of the object, and obtaining the dimension-difference relating amount based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective parallel-direction distances of the reference edge points from a dimension center of the image of the object in the respective directions parallel to the search lines.

14. A recording medium on which an image-processing control program is recorded which is readably by a computer and is usable by the computer to process image data representing an image of an object taken by an image taking device, for obtaining a rotation angle of an actual rotation position of the object from a reference rotation position thereof, the image data being stored in an image-data memory, the control program comprising the steps of:

producing a plurality of search lines each of which perpendicularly intersects a corresponding one of a plurality of substantially straight portions of an edge of the image of the object, and obtaining the rotation angle based on a sum of a plurality of products each of which is obtained by multiplying a corresponding one of respective edge-point deviations of respective actual edge points where the search lines intersect the straight portions of the edge, respectively, from respective reference edge points on the search lines, in respective directions parallel to the search lines, by a corresponding one of respective perpendicular-direction distances of the search lines from a rotation center of the image of the object in respective directions perpendicular to the search lines.

* * * * *